US012688349B2

(12) United States Patent
Gelman et al.

(10) Patent No.: US 12,688,349 B2
(45) Date of Patent: **\*Jul. 21, 2026**

(54) MONITOR CIRCUIT TO DETERMINE INTEGRATED CIRCUIT CONDITION BASED ON DIAGNOSTIC CODE SEQUENCE

(71) Applicant: QUALCOMM Incorporated, San Diego, CA (US)

(72) Inventors: Anatoly Gelman, San Diego, CA (US); Michael James Smith, Vancouver (CA); James Cheng-Huan Wu, Vancouver (CA); Olivier Alavoine, San Diego, CA (US); Amit Aneja, Chandler, AZ (US)

(73) Assignee: QUALCOMM INCORPORATED, San Diego, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 18/482,703

(22) Filed: Oct. 6, 2023

(65) Prior Publication Data

US 2025/0027996 A1    Jan. 23, 2025

Related U.S. Application Data

(60) Provisional application No. 63/514,774, filed on Jul. 20, 2023.

(51) Int. Cl.
G06F 1/32        (2019.01)
G01R 31/3185    (2006.01)
(Continued)

(52) U.S. Cl.
CPC ... G06F 30/343 (2020.01); G01R 31/318566 (2013.01); G06F 1/3228 (2013.01);
(Continued)

(58) Field of Classification Search
CPC .... G06F 30/343; G06F 30/327; G06F 1/3228; G06F 1/3296; G06F 11/27; G06F 2119/06; G06F 2119/12; G01R 31/318566
See application file for complete search history.

(56) References Cited

U.S. PATENT DOCUMENTS 5,550,841 A * 8/1996 O'Brien ......... G01R 31/318544
714/724
5,701,409 A * 12/1997 Gates .................... G06F 11/261
714/48

(Continued)

FOREIGN PATENT DOCUMENTS

PT        110840 B      8/2022

OTHER PUBLICATIONS

International Search Report and Written Opinion—PCT/US2024/038775—ISA/EPO—Nov. 19, 2024.

*Primary Examiner* — Zahid Choudhury
(74) *Attorney, Agent, or Firm* — Loza & Loza, LLP

(57)        ABSTRACT

Aspects relate to monitoring timing margin of logic paths and its degradation through an integrated circuit. In one example an apparatus includes an integrated circuit having a logic path formed in the integrated circuit and a monitor circuit formed in the integrated circuit. The monitor circuit is configured to monitor a condition of the logic path and to generate a diagnostic code sequence to indicate the condition of the logic path over time. A monitor controller is configured to receive diagnostic codes of the diagnostic code sequence, to store the diagnostic codes in a log with a corresponding time stamp and to determine a condition of the integrated circuit based on the diagnostic code sequence.

19 Claims, 12 Drawing Sheets

(51) Int. Cl.

| | |
|---|---|
| *G06F 1/3228* | (2019.01) |
| *G06F 1/3296* | (2019.01) |
| *G06F 11/27* | (2006.01) |
| *G06F 30/327* | (2020.01) |
| *G06F 30/343* | (2020.01) |
| *G06F 119/06* | (2020.01) |
| *G06F 119/12* | (2020.01) |

(52) U.S. Cl.
CPC ............ *G06F 1/3296* (2013.01); *G06F 11/27* (2013.01); *G06F 30/327* (2020.01); *G06F 2119/06* (2020.01); *G06F 2119/12* (2020.01)

(56) References Cited

U.S. PATENT DOCUMENTS

| | | | |
|---|---|---|---|
| 8,132,136 B2 | 3/2012 | Bueti et al. | |
| 8,860,502 B2 | 10/2014 | Gemmeke et al. | |
| 11,386,252 B1 * | 7/2022 | Chingudi | G06F 30/3315 |
| 12,455,996 B2 * | 10/2025 | Gelman | G06F 1/3228 |
| 2004/0148111 A1 | 7/2004 | Gauthier et al. | |
| 2010/0218026 A1 * | 8/2010 | Toshimitsu | G06F 13/385 |
| | | | 710/14 |
| 2013/0088256 A1 | 4/2013 | Chlipala et al. | |
| 2014/0167812 A1 | 6/2014 | Jain et al. | |
| 2015/0039916 A1 * | 2/2015 | Case | G06F 1/263 |
| | | | 713/310 |
| 2015/0042369 A1 | 2/2015 | Chen et al. | |
| 2016/0188394 A1 * | 6/2016 | Schumacher | G06F 11/0778 |
| | | | 714/49 |
| 2017/0170815 A1 | 6/2017 | Stuijt | |
| 2019/0286179 A1 * | 9/2019 | Singh | G06F 1/324 |
| 2020/0213452 A1 * | 7/2020 | Ito | H04N 1/00037 |
| 2022/0006459 A1 | 1/2022 | Bautista Gabriel et al. | |
| 2023/0214292 A1 * | 7/2023 | Pandey | G06F 11/0781 |
| | | | 714/764 |
| 2025/0028377 A1 | 1/2025 | Gelman et al. | |
| 2025/0028890 A1 | 1/2025 | Gelman et al. | |

* cited by examiner

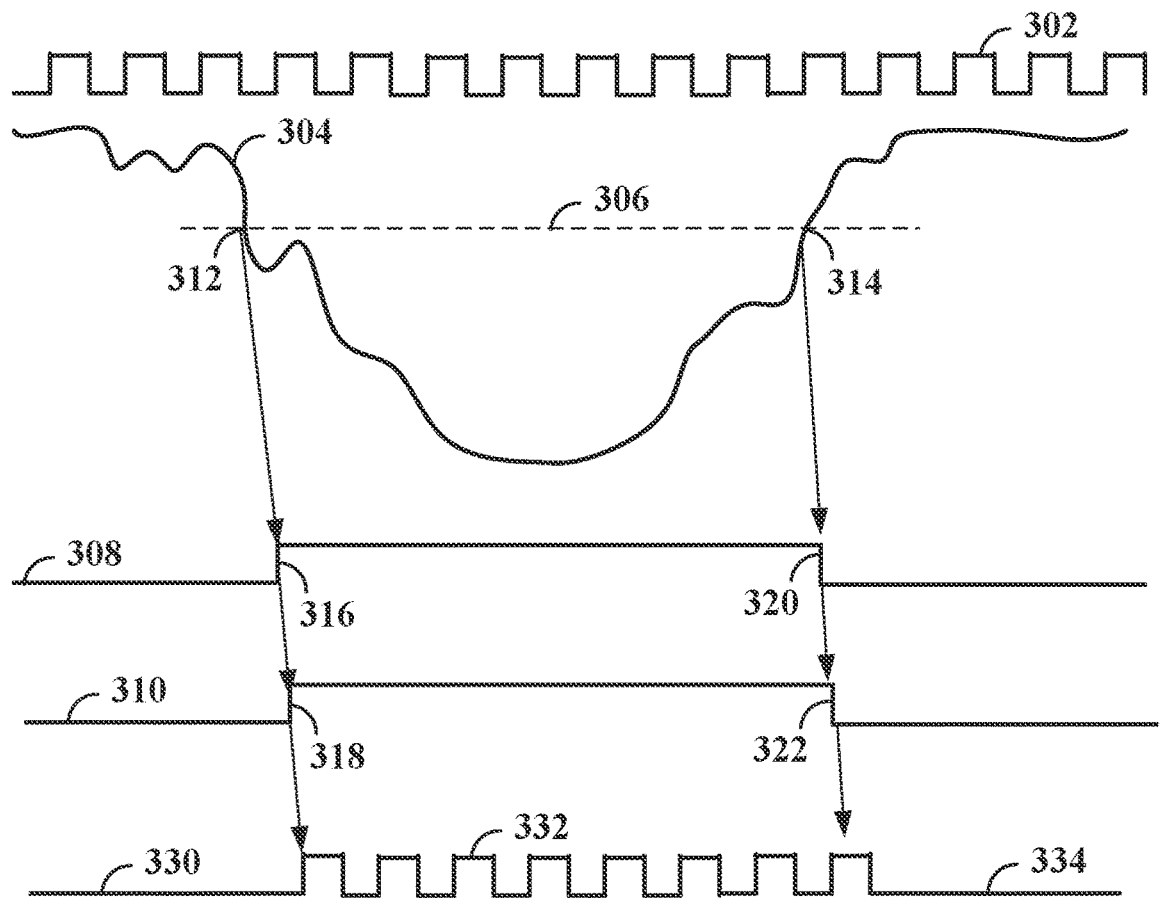
FIG. 3

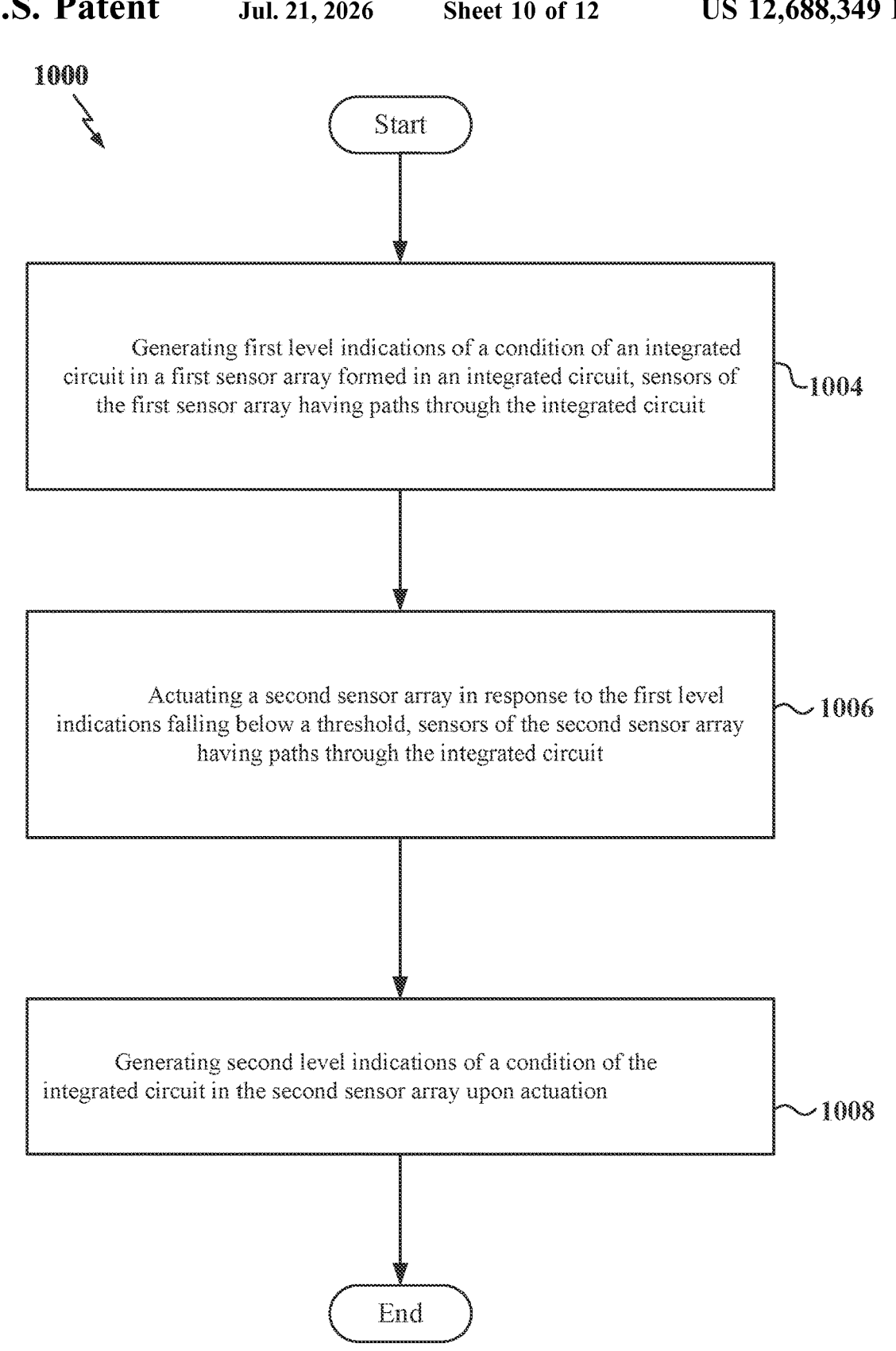

1000

Start

Generating first level indications of a condition of an integrated circuit in a first sensor array formed in an integrated circuit, sensors of the first sensor array having paths through the integrated circuit    1004

Actuating a second sensor array in response to the first level indications falling below a threshold, sensors of the second sensor array having paths through the integrated circuit    1006

Generating second level indications of a condition of the integrated circuit in the second sensor array upon actuation    1008

End

Start

Monitoring a condition of a logic path formed in an integrated circuit at a monitor circuit formed in the integrated circuit near the logic path ⌁1104

Generating a diagnostic code sequence to indicate the condition of the logic path over time ⌁1106

Determining a condition of the integrated circuit based on the diagnostic code sequence ⌁1108

End

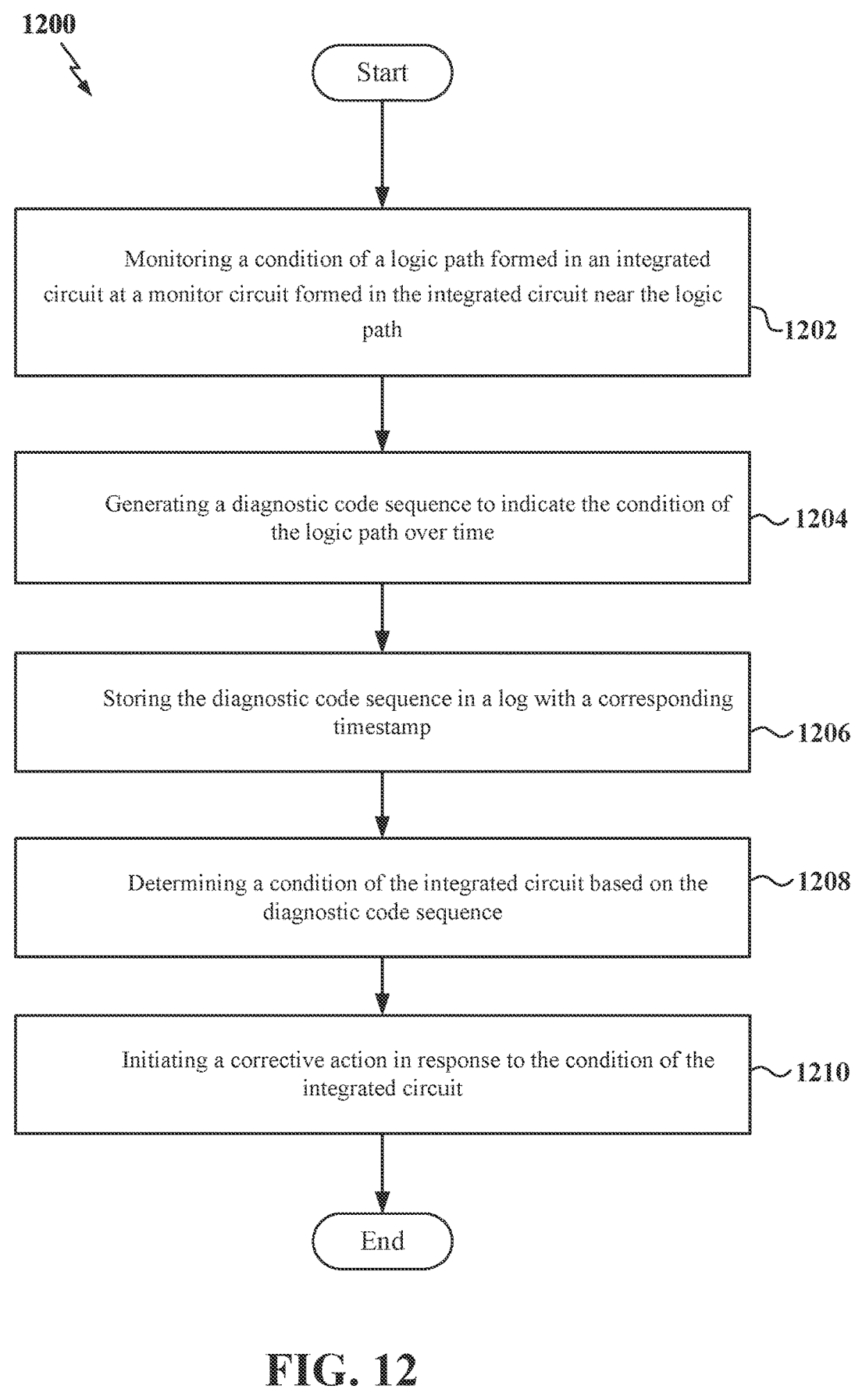

1200

```
          ( Start )
              │
              ▼
┌──────────────────────────────────────┐
│ Monitoring a condition of a logic path │
│ formed in an integrated circuit at a    │── 1202
│ monitor circuit formed in the integrated │
│ circuit near the logic path              │
└──────────────────────────────────────┘
              │
              ▼
┌──────────────────────────────────────┐
│ Generating a diagnostic code sequence  │── 1204
│ to indicate the condition of the logic  │
│ path over time                          │
└──────────────────────────────────────┘
              │
              ▼
┌──────────────────────────────────────┐
│ Storing the diagnostic code sequence   │── 1206
│ in a log with a corresponding timestamp │
└──────────────────────────────────────┘
              │
              ▼
┌──────────────────────────────────────┐
│ Determining a condition of the         │── 1208
│ integrated circuit based on the         │
│ diagnostic code sequence                │
└──────────────────────────────────────┘
              │
              ▼
┌──────────────────────────────────────┐
│ Initiating a corrective action in       │── 1210
│ response to the condition of the        │
│ integrated circuit                      │
└──────────────────────────────────────┘
              │
              ▼
          ( End )
```

FIG. 12

MONITOR CIRCUIT TO DETERMINE INTEGRATED CIRCUIT CONDITION BASED ON DIAGNOSTIC CODE SEQUENCE

CROSS-REFERENCE TO RELATED APPLICATIONS

The present application for patent claims priority to pending U.S. Provisional Application No. 63/514,774, filed Jul. 20, 2023, and assigned to the assignee hereof and hereby expressly incorporated by reference herein as if fully set forth below and for all applicable purposes.

TECHNICAL FIELD

Aspects of the present disclosure relate generally to monitoring logic paths of an integrated circuit and, in particular, to determining an integrated circuit condition based on a diagnostic code sequence from a monitor circuit.

BACKGROUND

Integrated circuits (ICs) are designed and manufactured to operate within a particular temperature range, minimum voltage, and clock speed. A method of providing reliable operation at target speed is sometimes referred to as timing closure. The minimum voltage and other parameters of the IC are selected in consideration of variations in the manufacturing process and the intended operating environment. An IC that is intended to operate in an environment with strict temperature and voltage controls may be able to operate at higher speed and lower voltage than a similar IC that is intended to operate in outdoor, industrial, or automotive environments.

The performance of ICs degrades over time and with use. As an IC ages, a higher minimum operating voltage and slower clock speed or both are required to maintain reliable operation. However, the higher voltage increases power consumption and heat and increases the rate of degradation. The degradation can cause a random distribution of faults often manifesting as transient or intermittent faults. Because the faults are intermittent, the causes are difficult to isolate. Exposure to higher temperature can lead to more pronounced ageing and degradation effects. The performance of power delivery networks (PDN) also degrades over time and with use as well causing additional performance degradation of an IC.

Greater reliability and longevity increase the value of an electronic system. This can be particularly important for safety and mission critical systems, e.g., in industrial, compute server, and automotive application. These may be deployed in challenging and significantly varying conditions, may cause damage in case of malfunction, and may not be easy to replace.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example an apparatus includes an integrated circuit having a logic path formed in the integrated circuit and a monitor circuit formed in the integrated circuit. The monitor circuit is configured to monitor a condition of the logic path and to generate a diagnostic code sequence to indicate the condition of the logic path over time. A monitor controller is configured to receive diagnostic codes of the diagnostic code sequence, to store the diagnostic codes in a log with a corresponding time stamp and to determine a condition of the integrated circuit based on the diagnostic code sequence.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

BRIEF DESCRIPTION OF THE DRAWINGS

FIG. 3 is a diagram of activation of a second sensor array subordinate to a first sensor array during a voltage droop according to aspects of the present disclosure.

FIG. 10 is a flow diagram of aspects of monitoring logic paths of an integrated circuit according to aspects of the present disclosure.

FIG. 12 is a flow diagram of remedial action for an integrated circuit according to aspects of the present disclosure.

DETAILED DESCRIPTION

Figure 1:
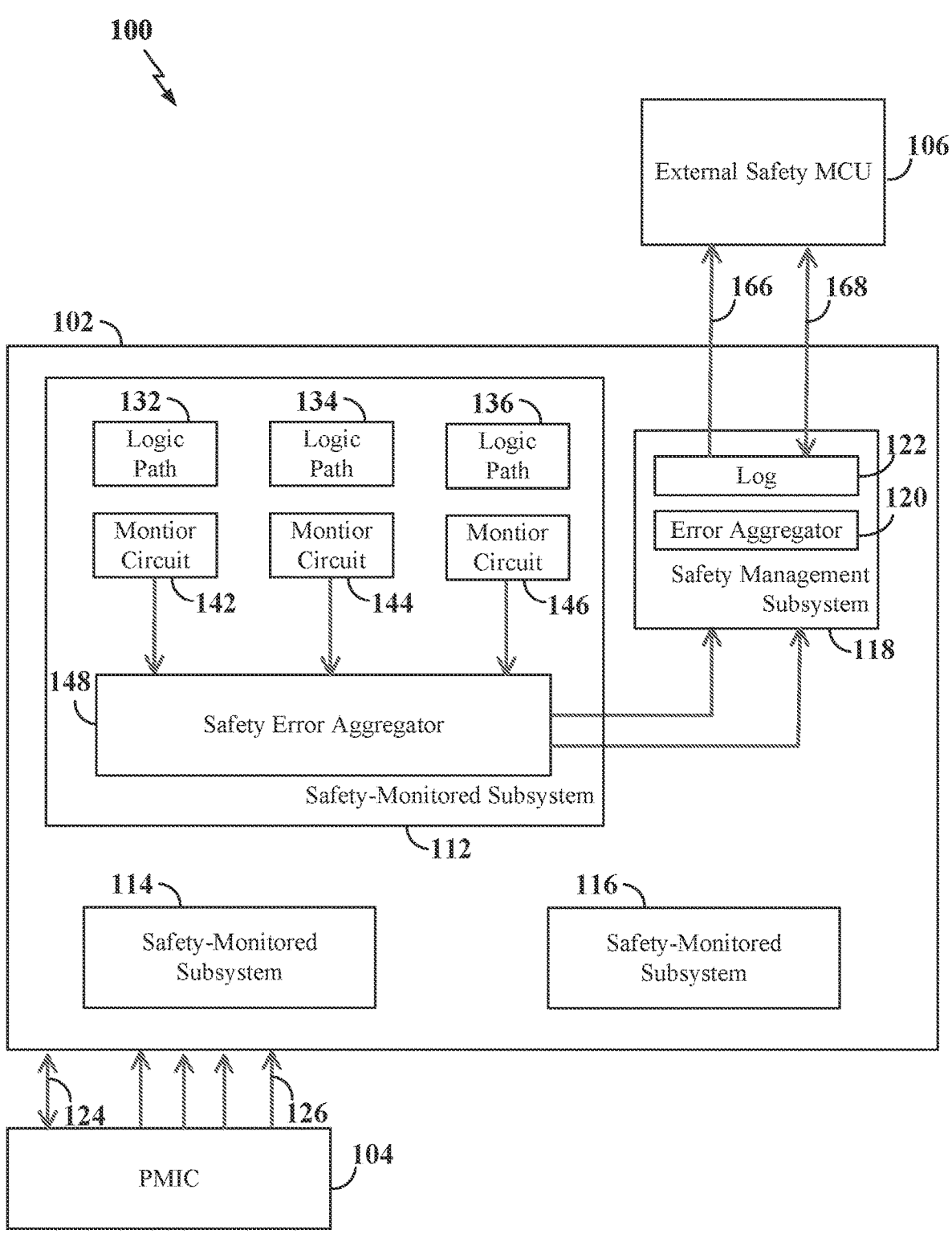
FIG. 1 is a diagram of a diagram of an IC that includes monitor circuits according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

A circuit to monitor the operational health of electronics within a system-on-a-chip (SoC), IC, or other electronic system can extend the lifetime of the product. Voltage monitoring and clock speed monitoring can be used for this purpose but may not be accurate enough for this purpose. Voltage and clock speed also do not reflect the combined effect of voltage and frequency on operational health.

As described herein, monitor circuits are deeply embedded within integrated circuits (ICs) to measure the timing margin near logic paths in an IC and may operate at the same frequency, voltage, and temperature as the logic paths. The monitor circuits may be constructed to resemble a characteristic circuit of the respective logic path. The operation of the monitor circuits mimics actual circuit operation during the life of the IC. The monitor circuits behave like full path replicas for key paths (data paths consisting, e.g., of sequential start point elements, combinational elements, and sequential end point elements) within the IC. In this way, each monitor circuit functions as a timing margin sensor at its respective position of the integrated circuit.

The monitor circuits provide measurement readings to determine setup timing margin that may be used as an estimate of the timing margin of the other similarly constructed logic paths, e.g., that a logic path is either nearing a timing violation failure or already has encountered a timing violation failure. In some examples, the monitor circuits generate diagnostic codes to indicate a condition of the corresponding logic paths. In some examples, the diagnostic codes are aggregated and sent to a monitor controller. In some examples, the monitor controller aggregates at least some of the diagnostic codes. A monitor controller generates a health (e.g., depth of margin) signal in response to the diagnostic codes. The health signal may be used as a notification for a remedial measure and/or for predictive analysis of the logic paths.

Using the health signal, an IC may be initially provisioned to operate at a lower voltage and/or faster clock speed. As the IC ages, the operating voltage may be increased and/or the clock speed reduced. The IC is initially more power efficient when it operates at a lower voltage and also has an extended lifetime as the initial voltage and temperature are lower. The IC may be part of a larger system, e.g., a system-on-a-chip (SoC), system-in-a-package (SiP), multichip module or other system, so that the entire system obtains these benefits. The components described herein may be placed on multiple IC's or a single IC. The health signal may also be used to trigger inspection, maintenance, repair, or a variety of warnings to suit different circumstances. While aspects are presented in the context of an SoC or integrated circuit, the methods and apparatus may be applied to multiple SoCs together and to other discrete ICs, including electronic control units (ECU), automotive advanced driver assistance systems (ADAS) e.g., for collision detection and avoidance and other components and systems.

The health signals provide error detectability and also enable predictive analysis of timing margin faults which can be used to develop a predictive maintenance framework, for example to predict maintenance or end of life. The predictive analysis is able to predict faults that can become failures as a device continues to age. This can have immense benefits to automotive, mission critical and industrial applications. Failures may be predicted in the field ahead of time. Patterns of failures may also be identified so that changes may be made for future device iterations.

FIG. 1 is a diagram of an electronic system 100 with IC 102 that includes monitor circuits. The IC 102 is powered by a Power Management IC (PMIC) 104 through multiple voltage rails 126. The IC 102 controls the PMIC using a control link 124. The IC 102 has multiple safety-monitored subsystems 112, 114, 116 of which three are shown for simplicity. Each safety-monitored subsystem may be a processing core or a larger processor or an independent processor, e.g., a Digital Signal Processor (DSP), Graphics Processing Unit (GPU), Video Processing Unit (VPU), Artificial Intelligence (AI) engine, Neural Signal Processing (NSP) engine, Application Specific Integrated Circuit (ASIC), sensor or sensor suite of an Inertial Reference Unit (IRU), or other electronic device.

In aspects described herein, monitor circuits 142, 144, 146 may be used to monitor the timing margin, also referred to as the timing guard band, throughout the IC 102. An array of monitor circuits 142, 144, 146 may be embedded in a safety-monitored subsystem 112 of the IC 102. While the present description is presented as pertaining to one or more safety-monitored subsystems coupled to a safety management subsystem 118, one or more of the safety-monitored subsystems may operate autonomously. In some applications, such systems may be referred to as a safety subsystem which may be a compute block like a central processing unit (CPU), graphics processing unit (GPU), artificial intelligence (AI) processing unit, Neural Signal Processing (NSP) unit, input/output (I/O) interface, infrastructure blocks such as memory controllers and other components whether discrete or within an SOC.

The safety-monitored subsystem may have physical characteristics and environments that resemble the characteristics and environments of logic paths 132, 134, 136 within the safety-monitored subsystem 112 that are being monitored. While only three logic paths and three monitor circuits are shown, a safety-monitored subsystem may have thousands or millions of logic paths and thousands of monitor circuits. The safety error aggregator 148 is coupled to a safety management subsystem 118 within the IC 102. In some aspects, the safety management subsystem 118 may be referred to as a safety island and have additional functions associated with a safety island. While the safety management subsystem 118 is shown as coupled to only one of the safety-monitored subsystems 112, a single safety management subsystem may be coupled to all of the safety-monitored subsystems and additional safety management subsystems may be used to receive error information from different parts of the IC 102. Error information from the safety error aggregator 148 is sent to the safety management subsystem 118 which may be a monitor controller for analysis. In some examples, an error aggregator 120 receives the error information and stores the error information in a log 122. The error information may be acted upon internally by the safety management subsystem 118.

The error information may also be accessible through an external data port 166 to an external Safety Management Control Unit (SMCU) 106, e.g., a functional safety system controller. While an SMCU is shown, any other suitable external controller may be used instead. The safety management subsystem 118 can communicate health messages and error information through a control interface 168, e.g., a serial bus. The external SMCU 106 may be coupled to multiple ICs 102 and to multiple safety management subsystems 118 throughout a system. The external SMCU 106 may also be coupled to external devices for reporting, diagnostic, and information purposes. In some examples, the external data port 166 provides for functional safety (FUSA) messages to be sent to the external SMCU 106. The safety error aggregator 148 may be configured to send a FUSA-ERROR message and a FUSA-WARNING message to the safety management subsystem 118. The safety management subsystem may then use the external data port 166 to send a FUSA-ERROR and FUSA-WARNING or any other suitable message to the external SMCU 106. The safety management subsystem may use the external data port to make data accessible to the external SMCU 106.

In some aspects, when the timing margin is within a maintenance range, e.g., the timing is moderately outside of the desired timing, then a FUSA-WARNING message may be sent. When the timing margin is within a zero-margin range, e.g., the timing has no further margin to avoid error or is near an error condition, then a FUSA-ERROR message may be sent. There may be additional messages to indicate which monitor circuits or groups of monitor circuits are operating within or outside of allowable margins and by how much. The messages may be configured to comply with external standards and to provide diagnostic and maintenance information.

In aspects herein, the timing margin is represented as a number of buffer or inverter circuits. Typical processor circuits have 15-100 buffer-equivalent delays in a logic path depending on the frequency. The setup timing margin, also referred to as the guard band is measured in units of standardized buffer delays or inverter delays. In some implementations, delay lines are constructed out of inverters. The monitor circuits measure setup timing margin. For the setup time to be adequate for proper function, the transitions at the endpoint storage element are fully settled prior to the next active edge of the clock signal.

Maintenance level messages may cause maintenance operations to be performed. As an example, the safety management subsystem or the CPU or other processing core may cause the PMIC 104 to provide a different, safer voltage to be supplied over the voltage rails 126 at a suitable time, e.g., at the next boot or at the next drive cycle or immediately upon notification. The maintenance level message may be monitored over time such that a consistent maintenance level message may cause the error level to mature and a diagnostic code to be generated to the external SMCU 106. This may cause the code to be displayed on a user interface or to be sent to an external maintenance facility. When a zero-margin message is generated, it may be considered a potential safety or failure warning. When a zero-margin message is repeated after a voltage adjustment or reboot, then the safety management subsystem may initiate a full or partial shutdown. The safety management subsystem may also inform an external SMCU to take necessary action in accordance with a safety policy contained within the SMCU so that the system is put into a safe state. The safe state may be a lower performance state, a lower functionality state or a complete shutdown of one or all systems of the IC 102. The safe state may also include a notification to the driver or user about the error or about a new operational state indicating limited functionality. The log 122 may also be made available through the external data port 166 for test, predictive maintenance, and research purposes to understand the behavior of the IC 102 over time.

The error aggregator 120 receives the margin measurements from the safety error aggregator 148 of each of the safety-monitored subsystems 112, 114, 116. The margin measurements or safety errors are aggregated at the safety error aggregator 148 to store in the log 122. The aggregated margin measurements may be stored in the log 122 as a sequence of diagnostic codes that are collected during the operation of the IC 102 over time. A diagnostic code sequence may be stored in the log 122 when a code of the diagnostic code sequence exceeds a pre-configured marginality threshold. The diagnostic codes may be tested or analyzed to find ageing markers that are stored, e.g., as flags, in the log 122 or another non-volatile memory of the IC 102 or an external system. As the ageing markers accumulate over the lifetime of the IC 102, the IC may be configured to read the ageing markers upon any system start and apply a remedial action, e.g., ageing compensation. The reading and applying may be performed by the safety management subsystem 118 or any other suitable component of the IC 102 or external component. If, after the application of the remedial action, the monitor circuits report an error, warning, or similar problem in the IC, then a new ageing marker, e.g., a flag, can be stored. The log 122 may be used as a diagnostic trace for the stored ageing markers.

The timing margin of any IC or part of an IC within the IC 102 as it degrades or completely fails for a variety of reasons may be detected using the monitor circuits. The monitor circuits 142, 144, 146 send the detected level of margin to the safety error aggregator 148. The margin measurement may be in the form of a diagnostic code having a single bit for a positive margin or zero margin, or in the form of a diagnostic code having multiple bits e.g., 2 bits or 8 bits to indicate an amount of margin. The monitor circuits 142, 144, 146 may be formed to monitor particular logic paths 132, 134, 136, but the detected performance may also indicate the condition of many other paths of the IC that are not shown for simplicity. The operating condition of the monitor circuits 142, 144, 146 may be representative of the condition of larger areas or particular sections of the IC 102.

The minimum voltage that is required for a circuit to operate reliably (Vmin) degrades over time so that the voltage being supplied by the PMIC 104 may become too low for reliable operation of the circuit. This causes undervoltage issues. Ageing and degradation may require a higher voltage setpoint than that set for a new system when an IC was manufactured and tested. The IC may also have degraded beyond other compensations that were tested and characterized at the factory. These compensations may include process variation compensation and temperature variation compensation.

The monitor circuits 142, 144, 146 are used to determine which areas of the IC 102 and which types of logic paths 132, 134, 136 fail to meet the setup timing requirements for which they were designed to operate reliably. A timing failure in an IC's logic paths may cause incorrect operation or complete loss of function in some cases. The voltage applied by the PMIC 104 to various parts of the IC 102 through the voltage rails 126 may be adjusted through a control link 124 between the PMIC 104 and safety management subsystem 118. The voltage may be adjusted, e.g., increased.

The degradation over time may be caused in part by electro-migration which effectively increases the resistance of metal conductors on the IC through the die and also through conductors of the package and package connectors. Printed Circuit Board (PCB) metal traces are also affected by electro-migration. The degradation over time may be additionally caused by a Hot Carrier Injection (HCI) effect which effectively causes a gradual shift in transistor threshold voltage (Vt). Additional degradation over time may be caused by Negative Bias Temperature Instability (NBTI) and Positive Bias Temperature Instability (PBTI) effects which also may cause a gradual shift in transistor threshold voltage (Vt). These degradation phenomena can cause random errors in logic paths throughout an IC.

Ageing and degradation may also cause deficiencies or glitches in a Power Delivery Network (PDN) and Power Management Integrated Circuit (PMIC) which power voltage rails that are coupled to the IC. Degradation may also cause excessive clock jitter or glitches in phase-locked loops (PLLs) and clock distribution within the IC. Such short temporal power and clock glitches or excessive clock jitter can be hard to detect and can impact circuit operation. As with the IC to which it is coupled, a higher minimum voltage may be required for the PMIC and PDN over time. A higher voltage may prevent a random distribution of faults often manifesting as transient or intermittent faults which are seen momentarily during operations. These faults may stop for some time and then reappear with no predictable pattern. A further cause of errors is caused by the degradation of capacitors used by the PDN and PMIC. These may no longer be able to adequately respond to changes in the load from the IC. The capacitors also degrade over time causing larger voltage droops on the power rails. Some capacitors may lose as much as a third of the original capacitance over the service life of a system.

The monitor circuits 142, 144, 146 may be used to monitor the timing effects of voltage-related stress, temperature-related stress, and activity-related stress of the circuits of the IC including logic paths, PLLs, and clock distribution. Additionally, the monitor circuits 142, 144, 146 may be used to monitor the timing effects as a path margin of voltage-related stress, temperature-related stress, and activity related stress circuits of the PMIC, and circuits of the PDN. Additionally, the monitor circuits 142, 144, 146 may be used to monitor the timing effects of physical defects on the PCB, like capacitors losing proper electrical connection to PCB. By using an independent circuit with margin control, the circuit can be configured to fail first (e.g., provide an indication of depleted or reduced operating margin) and provide an indication of depth-of-margin reflecting the overall effects of silicon performance, voltage, frequency, and temperature. The monitor circuit is fail-first in that it may be configured to fail before the monitored circuits. This allows the indication to be generated early enough for maintenance or to initiate an orderly shutdown. The construction is referred to herein as worst-case replica paths in that the monitor circuits reflect the worst case of fabrication and operation conditions with respect to failing.

The monitor circuits 142, 144, 146 may be in the form of worst-case path replicas for logic paths 132, 134, 136 within the safety-monitored subsystem with associated checker logic. Key circuits exhibiting worst-case behavior may be selected for monitoring. The replica paths may replicate sequential elements of logic circuit paths and associated combinational logic paths with respect to timing. This allows the timing margin of the sequential elements of logic circuit paths and associated combinatorial logic paths to be replicated. The replica paths may be formed near the logic paths 132, 134, 136 that are to be monitored. This may include replica paths that are deeply embedded within safety critical circuits and that operate at the same frequency, voltage, and temperature as the safety critical circuits. The monitor circuits replicate the timing aspects of operation of the actual safety critical circuits that are being monitored during mission mode or another mode. A mission mode is a concept in automotive functional safety. The IC, including safety-monitoring and safety-managing subsystems, completes boot and initialization processes to enable path margin monitoring. The expected safety mechanisms are activated and the fault monitoring of the safety management subsystems has been activated. After these operations, when the safety-monitored subsystems 112, 114, 116, and the safety management subsystems are performing the defined safety functions, then the subsystems are in mission mode. The path replicas are monitored and margin measurements thereof may be used as inputs for health monitoring and data for predictive analysis. The analysis may predict faults that can later manifest as failures in the paths that are being monitored as the monitored paths degrade further.

The output may be provided to a higher-level software system for evaluation. The monitor circuits can be used to reduce costs in automotive safety, ageing tracking, predictive maintenance, power optimization, and test. Using higher-level software, events that mark ageing in the IC may be logged and used to adjust the IC's voltage, frequency, and active functions on the next boot or drive cycle. Ageing tracking may be performed by storing ageing markers into a non-volatile memory, e.g., a log, once per drive cycle. The markers are then read on the next system start. The power management integrated circuit voltage setting may be increased based on the number of ageing markers, up to a maximum voltage limit. A maintenance event may be declared once the maximum voltage limit is reached.

Figure 2:
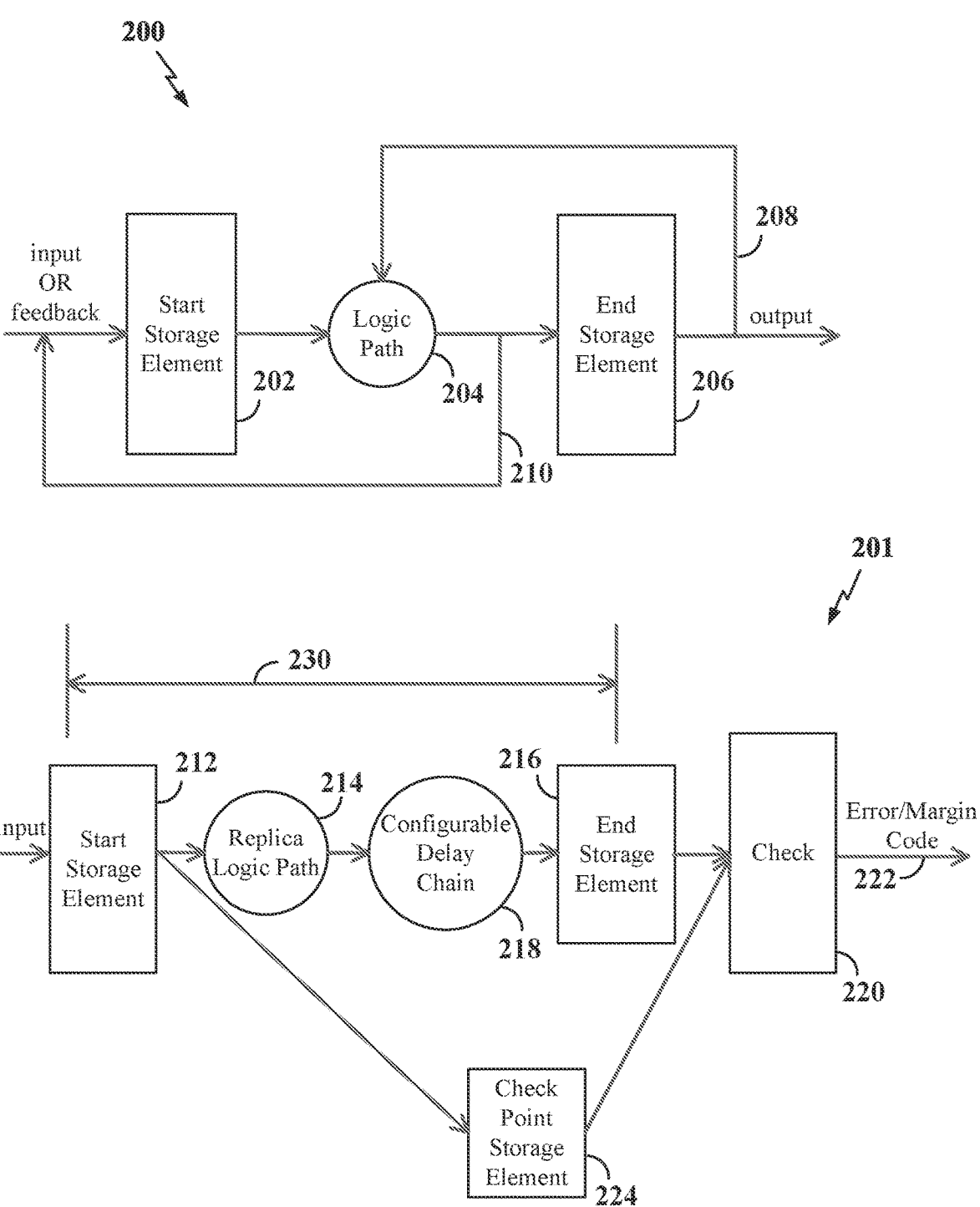
FIG. 2 is a diagram of a logic path and monitor circuit suitable for evaluating the performance of the logic path according to aspects of the present disclosure.

FIG. 2 is a generalized diagram of a logic path and monitor circuit suitable for evaluating the performance of the logic path. A portion of an IC 200 may have thousands or millions of transistor circuits forming logic paths that operate at a particular toggle rate. The toggle rate is determined by the switching activity of the respective transistor switch. For example, a logic path that changes state from 0 to 1 in one cycle and then back from 1 to 0 in the next cycle has a maximum toggle rate. A logic path that is seldom used, e.g., a square root circuit will have a lower toggle rate than a logic path that is frequently used, e.g., an addition circuit. In addition to the nature of the circuit, the toggle rate is a function of the input clock rate and duty cycle of each particular switch device, e.g., transistors, logic gates, etc. Accordingly, different portions of an IC and different circuits in each portion may have different toggle rates. Inputs or feedback are received at a start storage element 202, e.g., collections of flip-flops, and are applied to a logic path 204, e.g., a combinational logic path, to be processed. The logic path 204 generates outputs that are sent to an end storage element 206, e.g., additional collections of flip-flops to provide an output that is sent to other logic paths (not shown) for additional processing. Signal feedback 208, 210 represent a generalized structure of a monitored logic path within the IC 200 from the perspective of the setup timing.

A monitor circuit 201 may be used as a sensor and has a start storage element 212 that may generate deterministic or random values as inputs to a replica logic path 214. The replica logic path 214 is not used for generating or processing data but to replicate the timing aspects of operation associated with a logic path 204 that is to be monitored. The replica logic path 214 may be formed to correspond with how the logic path 204 was formed and may be formed using a lower manufacturing margin so that the replica logic path 214 is likely to fail before the logic path 204. The replica logic path 214 is driven at the same voltage and experiences the same temperatures as the logic path 204. A toggle rate may be controlled for the replica logic path 214 that causes similar, slower, or faster degradation, e.g., a little faster degradation, than that of the logic path 204. For some instances, the toggle rate may be a little faster than that of the logic path 204 but for other instances, the toggle rate may be a little slower. The replica logic path 214 can be operated in a worst-case scenario to ensure that errors are generated before system failure. The replica logic path 214 may also operate at a known toggle rate with a pre-determined relationship to the expected worst case toggle scenario for the functional paths.

In some examples, a simple toggle rate control mechanism (not shown) may be implemented using time-window averaging. The toggle rate mechanism may be coupled to the input of the start storage element 212 or to the clock input of the circuit (not shown). The toggle rate mechanism will apply inputs at a regulated rate or provide the clock signal at a regulated rate to obtain a particular toggle rate. Within a given periodic time window, the number of toggles of monitor circuits is counted. If the observed toggle rate is higher or lower than a preset threshold then the toggle rate of the replica logic path 214 is changed up or down by a pre-set value for the next time window. In an example, as shown, e.g., in FIGS. 6, 7, and 9, there are two path margin sensor arrays and the monitor circuit 201 is a representative example of a sensor of either the first sensor array or of the second sensor array. In some aspects, the sensors of the first sensor array and the second sensor array are the same but have different toggle rates. In some aspects, the sensors of the second sensor array are configured and fabricated to more closely resemble a respective monitored circuit. The number of second sensor array toggles within a periodic time window is counted. As described in more detail in the context of FIGS. 3, 6, and 7, if the observed toggle rate of a second sensor array is higher than a preset threshold then the replica path margin threshold of the first sensor array, which is used for activation of the second sensor array, may be adjusted towards triggering less often by one pre-set value for the next time window. When the time window includes periods of activation and periods of inactivity in the same time window, then changing the threshold for activation of the second sensor array changes the toggle rate through the entire window towards the desired target. The second sensor array can toggle at the system clock rate when active yet the duty cycle of the monitor circuits is reduced. Similarly, if the observed toggle rate is lower, then the opposite adjustment is made.

The effect of the toggle rate on ageing degradation may be known, e.g., predetermined based on the semiconductor process and operating voltage/temperature conditions, due to the characterizations made for a particular manufacturing process and circuit configuration. The worst-case toggle condition, expressed as a toggle rate, may also be known. In some examples, the worst-case toggle rate condition may be selected as a target to be achieved by the replica logic path 214.

The output of the replica logic path 214 is provided to a configurable delay chain 218 that is coupled to end storage elements 216. The configurable delay chain 218 produces multiple versions of the output of the replica logic path 214 output with different amounts of delay. Registered versions of outputs of the configurable delay chain 218 are sent from the end storage element 216 to a check circuit 220. The path cycle time 230 between the start storage element 212 and the end storage element 216 with the delay chain 218 configured for the lowest delay may be considered to be the timing closure for a worst-case negative timing slack. The timing check may be adjusted using the configurable delay chain 218. The check circuit 220 compares the registered version captured at the configurable delay chain 218 output by the end storage element 216 to a reference value from a check point storage element 224 that did not go through the replica logic path 214. Using this comparison, the timing margin of the sensor is determined at the check circuit 220. The timing margin between the output of the replica logic path 214 and the input of the end storage element 216 is determined by comparison at the check circuit 220. The check point storage element 224 provides an expected value. The end point storage element 216 provides a captured value after the delay caused by the replica logic path 214 and the configurable delay chain 218. If the values from the end storage element 216 and the check point storage element 224 are identical, then the timing margin to the end point storage element 216 is at least the amount of the configurable delay chain 218. The check circuit 220 produces error or margin codes 222 for the replica logic path 214 to reflect the comparison. The check circuit 220 generates the error or margin codes 222 as time-domain margin status messages. The messages may be sent to an aggregator or a monitor controller (not shown). In the illustrated example, there is no loading of actual endpoints into the check. The check is done based on values received from the end storage element 216.

The storage elements 212, 216 and 224 are driven by a clock and the check circuit 220 may be driven by the same clock to generate an error/margin status code. The monitor circuit 201 may also be operated at a particular duty cycle using an enable signal (not shown). The monitor controller (not shown) may drive the enable signal, e.g., high or low or on or off, to control the monitor circuit 201. There may be multiple redundant monitor circuits in any desired integrated circuit area. The monitor controller may be able to individually disable any of the monitor circuits using the enable signal. There may also be a provision to globally disable all of the monitor circuits using a common signal or broad addressing scheme that is coupled to the enable signal.

The margin codes may be generated even if margin violations are encountered during voltage and frequency change events due to Dynamic Voltage and Frequency Scaling (DVFS) features of the system. While separate clock and voltage monitors can introduce limitations in the monitoring and introduce monitoring gaps when the DVFS system makes a transition, that is not necessary with this type of monitor. The described monitor circuits are able to monitor the IC at all times and do not depend on the operation, e.g., voltage and frequency state of the circuits that are being monitored. A single monitor circuit may be used for continuous coverage or multiple monitor circuits as sensor arrays may be used for continuous coverage. This monitoring is continuous even when clock and voltage monitors are not available.

The toggle rate of the replica logic path 214 may be controlled and the entire path from the start storage element 212 to the end storage element 216, etc., may be turned off or disabled to reduce power consumption. In some examples, margin codes are reported continuously at a selected toggle rate. In some examples, a second sensor array of monitor circuits also toggles during worst-case system conditions. Additional monitoring during worst case conditions provides for continuous depth-of-margin reporting when it becomes necessary to the system.

Figure 4:
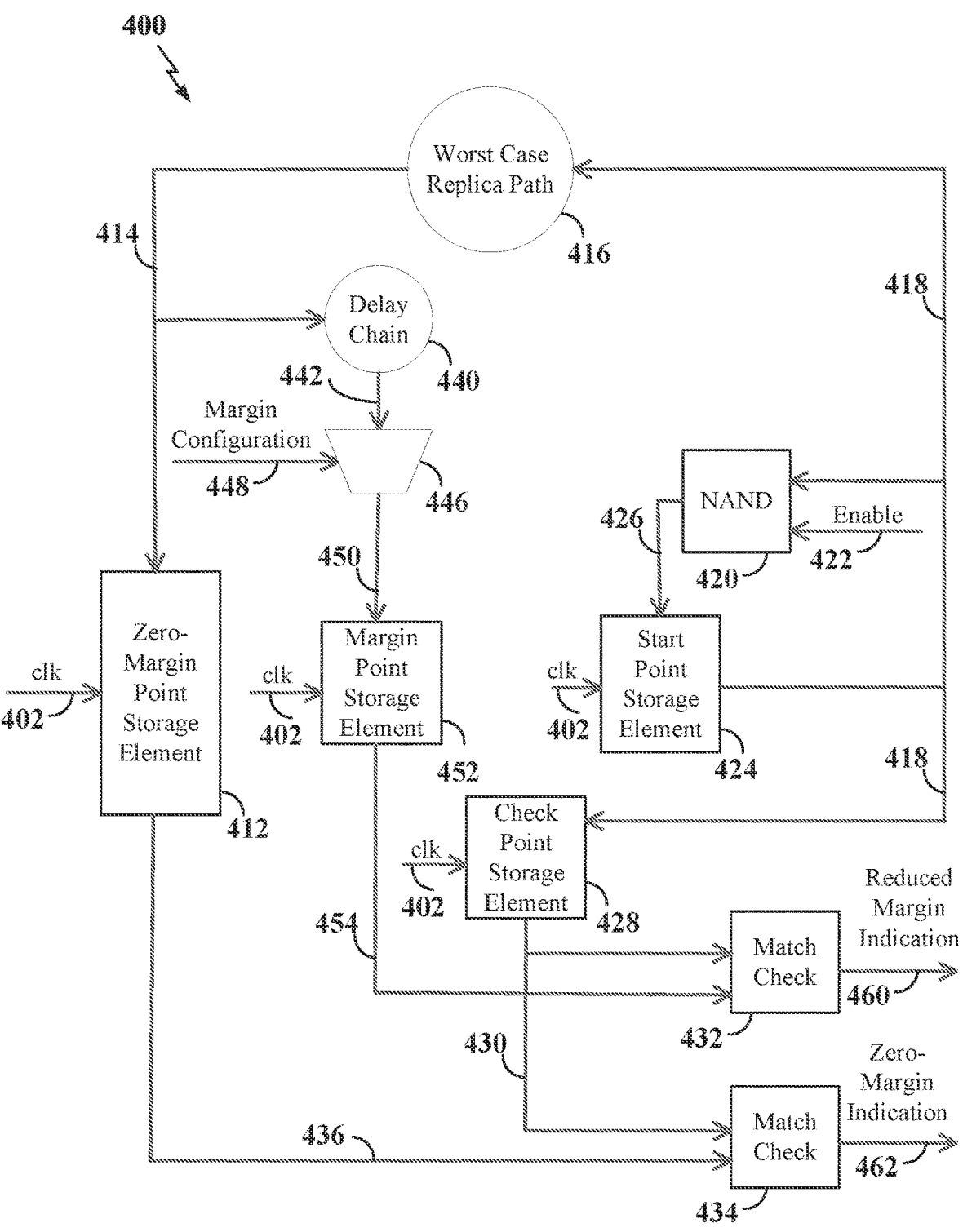
FIG. 4 is a diagram of a single monitor circuit suitable for evaluating the performance of the logic path according to aspects of the present disclosure.
Figure 5:
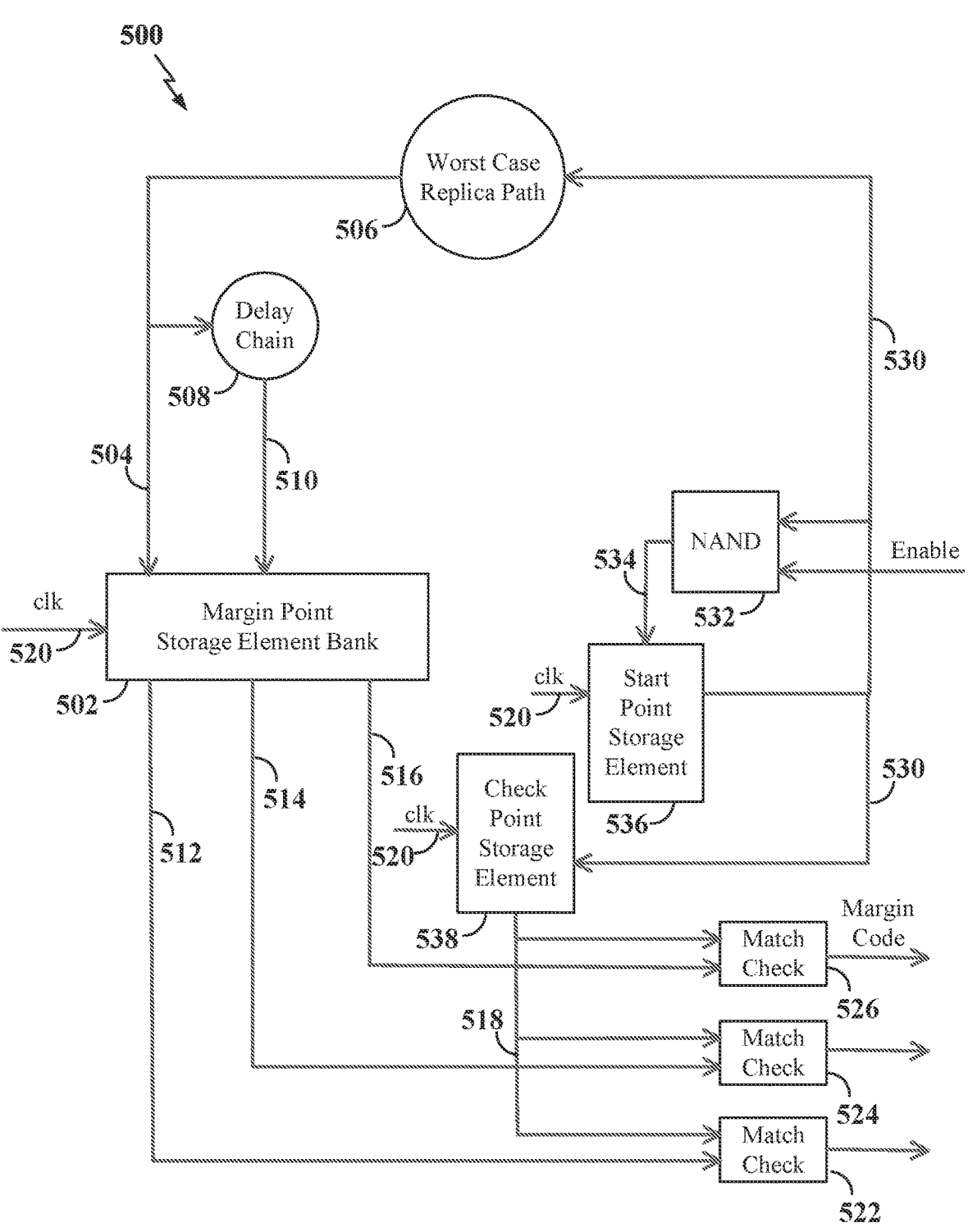
FIG. 5 is a diagram of a single monitor circuit suitable for evaluating the performance of the logic path according to aspects of the present disclosure.

FIG. 3 is a diagram depicting sensor activation for two sensor arrays during a voltage droop in a two-level arrangement. The sensors of each sensor array may be formed of monitor circuits 201 or as shown in FIGS. 4 and 5. A first sensor array (L1) has a continuously running clock signal 302 that reflects the continuous monitoring function of the L1 array. The clock signal on the graph 300 is shown as high logic level and low logic level transitions on the vertical axis against time on the horizontal axis. A voltage 304 applied to the IC is shown with amplitude on the vertical axis versus time on the horizontal axis. The voltage 304 is affected by different conditions of load, temperature, and ageing that cause variations in the voltage. A voltage trigger level 306 is shown to depict a concept of two-level monitoring. The voltage trigger level 306 is controlled by comparing a timing margin threshold to a margin indication from the L1 Sensor array.

A droop in the voltage 304 below the voltage trigger level 306 at time 312 triggers a margin violation indication 308 to transition at time 316 from a low logic level to a high logic level. A margin violation indication 308 for the L1 array may then be used to trigger an enable signal 310 for a second sensor array (L2) to transition from low logic level to a high logic level at time 318. When this event happens, the voltage trigger level 306 is, accordingly, used to enable the L2 sensor array when the voltage 304 has moved into areas that require more active monitoring. Similarly, an increase in the voltage 304 above the voltage trigger level 306 at time 314 causes the margin violation indication 308 to transition from a high logic level to a low logic level at time 320. This then causes the enable signal 310 to transition from high logic level to a low logic level at time 322.

When the enable signal 310 is high, between time 318 and time 322, the L2 sensor array is clocked by a clock signal 332. The L2 clock signal has a flat region 330, e.g., a disabled region, before the enable signal 310 goes to a high logic level at time 318 and a flat region 334 after the enable signal 310 returns to a low logic level after time 322. The L2 sensor array may provide a higher precision, also referred to as greater depth or greater reporting depth, indication of the timing margin for the monitored circuits of the IC or it may produce the same depth. In some embodiments, the L2 sensor array may provide a higher precision by using a larger number of monitor circuits in the array whether or not the monitor circuits of the L2 sensor arrays are the same or different from monitor circuits of the L1 sensor array. In some embodiments, the L2 sensor array may provide a higher depth by using a larger number of delay elements in the configurable delay chain. In a two-level (L1, L2) system, remedial actions and health reports may be based on the higher precision margin indication of the L2 sensor array. When the enable signal 310 is a low logic level, the power consumption of the L2 sensor array is reduced or eliminated since its operation is stopped. This also reduces some heat and ageing for the rest of the IC. As shown, the time residency of the enable signal 310 is monitored to infer an actual average toggle rate of the L2 array FIG. 4 is a diagram of a single monitor circuit 400 suitable for use as a sensor as described herein and providing a building block for a larger array of monitoring circuits suitable for evaluation of the performance of a logic path. A system clock 402 is supplied to a start point storage element 424. A start timing signal 418 from the start point storage element 424 is applied to a worst-case replica path 416. The worst-case replica path emulates the operation and wear that occurs to a logic circuit of the IC. The surrounding components control the toggle rate of the worst-case replica path 416 and provide a timing standard to compare against the timing of the worst-case replica path 416. This timing standard is from the check point storage element 428 that conveys the expected result on a timed output 430. The expected result is a result that a fully functional monitored circuit with a robust timing margin would be producing. The difference between the timing standard and the worst-case replica path is derived at match checks 432, 434 to determine timing margins. An output signal 414 of the worst-case replica path 416 is applied to a delay chain 440 and to an input of a zero-margin point storage element 412. The worst-case replica path 416 is operated with a timing and a toggle rate that is set by a monitor controller (not shown) to best reflect the condition of an associated logic path.

A delay chain 440 generates a delayed version 442 of the output signal 414. In some aspects, there are multiple delayed versions 442 of the output signal 414 and these are all supplied to a multiplexer 446. The multiplexer 446 is controlled by an external margin configuration signal 448 that may be provided by e.g., a monitor controller (not shown), to select one of the delayed versions 442 as a multiplexer 446 output 450 to a margin point storage element 452. The margin point storage element 452, using the system clock 402, generates a suitable timing signal 454 to apply to a reduced margin match check 432. The timing signal 454 from the margin point storage element 452 is a registered version of the output signal 450 which represents overall timing of the worst-case replica path 416 with additional delay 440. The amount of delay is controlled by the margin configuration signal 448 that controls the selection at the multiplexer 446. The reduced margin match check 432 then compares the timing signal 454 at the output of the margin point storage element 452 to the reference from the check point storage element 428 to determine a reduced margin indication 460.

A zero-margin point storage element 412 also receives the output signal 414 of the worst-case replica path 416 and the system clock 402 and generates a timing signal 436 to apply to a zero-margin match check 434. The input to the zero-margin point storage element 412 does not have any delay from the delay chain 440 or the multiplexer 446. The zero-margin match check 434 then compares the timing signal 436, the zero-margin signal from the zero-margin point storage element 412, to the same reference from the check point storage element 428 to determine a zero-margin indication 462. The timing signals 454, 436 provide observed output to determine the margin and zero-margin condition for the worst-case replica path circuit 416. The timing signals reflect the timing of the worst-case replica path 416. A timed output 430 provides a reference, e.g., an expected value for the timing check.

As mentioned above, the start timing signal 418 is the input that drives the worst-case replica path at the desired toggle rate. To enable the sensor, and to regulate the toggle rate of the start timing signal 418 of the start point storage element 424, it is also provided to a NAND gate 420 that performs a NAND operation with the start timing signal 418 and an enable signal 422, e.g., from a monitor controller, to generate a NAND output 426. The NAND output drives the operation of the start point storage element 424 based on the enable signal 422. A check point storage element 428 receives the start timing signal 418. The NAND output 426 is coupled back to the start point storage element 424. As a result, the start point storage element 424 generates the start timing signal 418 that toggles when the enable signal 422 to the NAND gate 420 is active. The check point storage element 428 generates a timed output 430 that reflects the timing of the start point storage element 424. The timed output 430 is applied to the reduced margin match check 432 to generate a reduced margin indication 460 when the worst-case replica path 416 generates an output at a reduced margin or maintenance level, as described above. The timed output 430 is also applied to the zero-margin match check 434 to generate a zero-margin indication 462 when the worst-case replica path 416 generates an output at a zero margin or error level, as described above. Accordingly, the monitor circuit 400 generates at least one of two signals, the reduced margin indication 460 and the zero-margin indication 462. This allows for an indication of the condition of the underlying IC in the area of the monitor circuit. The two signals may be rendered as a diagnostic code and the outputs of many monitor circuits may be aggregated or combined in any way to generate a diagnostic code with more precision or more bits. The monitor circuit may be used in a first-level or second-level sensor array and there may be many such monitor circuits 400 in each array. More multiplexer 446 outputs 450 may be used with more match checks to generate more indications.

FIG. 5 is a diagram of another single monitor circuit 500 which can form an array suitable for evaluation of the performance of a logic path. A worst-case replica path 506 is operated with a start timing signal 530 and toggle rate that is set by a monitor controller (not shown) to best reflect the condition of an associated logic path. The worst-case replica path 506 generates an output signal 504 that is applied directly to a margin point storage element bank 502 and to a delay chain 508.

A system clock signal 520 (clk) is also supplied to the margin point storage element bank 502, e.g., a set of flip-flops that generates multiple timing outputs, 512, 514, 516 that are each applied to respective match checks 522, 524, 526. The delay chain 508 receives the output signal 504 from the worst-case replica path and generates a delayed version 510 of the output signal 504. The delayed version allows the margin point storage element bank 502 to form the basis for the timing outputs 512, 514, 516 in multiple timing versions and with simpler circuitry than in FIG. 4. While three timing outputs are shown, there may be many more, e.g., six or eight for a six-bit or eight-bit margin code. In some aspects, there may be only one or two timing outputs for a one or two-bit margin indication.

A start point storage element 536 generates the start timing signal 530 in response to a system clock 520 and NAND output 534. As in the example of FIG. 4, the start timing signal 530 toggles when a NAND gate 532 is enabled by an enable signal. The start timing signal 530 is provided to a check point storage element 538. The check point storage element 538 is also coupled to the system clock 520 (clk) to generate a timed output 518 that reflects the state of the start point storage element 536. The timed output 518 is applied to each of the match checks 522, 524, 526 to collectively generate a multiple bit diagnostic code, e.g., a margin code. Each match check 522, 524, 526 receives the same check point storage element 538 timed output 518 and compares it to different timing outputs 512, 514, 516 from the margin point storage element bank 502 to make a different timing comparison and generate a different part of the margin code. The outputs of each match check 522, 524, 526 are combined to create the margin code that may be used as a diagnostic code or an indication of a condition of the IC in the monitored area. The codes may be aggregated with those of other monitor circuits.

Figure 6:
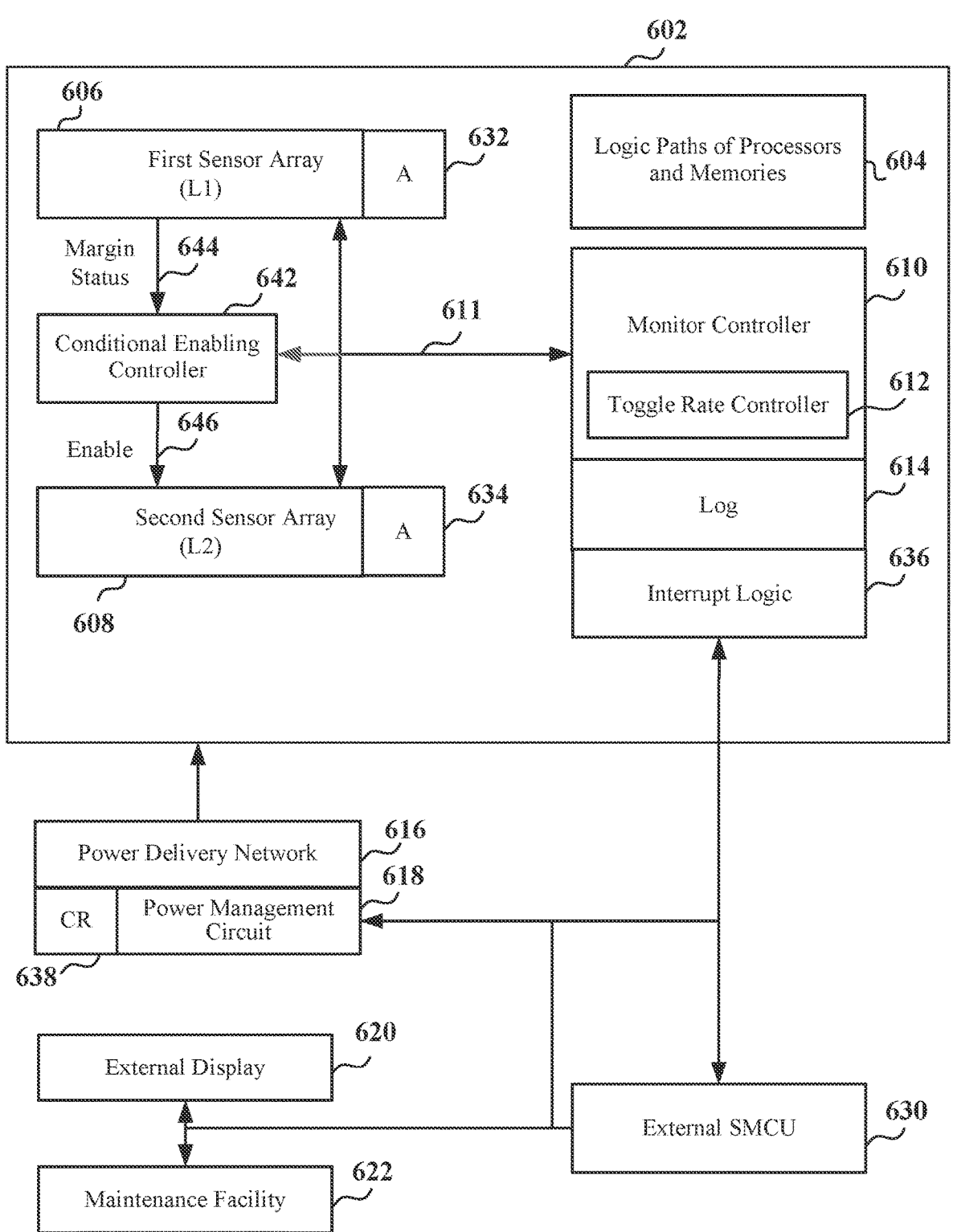
FIG. 6 is a functional block diagram of a multiple tier sensor system according to aspects of the present disclosure.

FIG. 6 is a functional block diagram of a multiple tier sensor system. An SoC 602 contains logic paths 604 of the processors and memories of the SoC that are monitored by two levels, L1, and L2, of monitor circuits. The logic paths and the monitor circuits are distributed throughout the SoC, although they are shown as isolated in the diagram to better illustrate functions and connections. A first sensor array 606 represents the first level (L1) and a second sensor array 608 represents the second level (L2). Both the first sensor array 606 and the second sensor array 608 are coupled to a monitor controller 610 through a control channel 611. The sensor arrays may be formed using monitor circuits as described in any one or more of FIGS. 2-5. The two levels of monitor circuits allow the second sensor array 608 to be enabled by a conditional enabling controller 642 in response to a margin indication from the first sensor array 606.

In some examples, the second sensor array 608 is enabled less of the time which allows for more accurate tracking of the ageing of the logic paths and memories of the SoC by matching the SoC's worst-case toggle-rate. In any actual circuit, the duty cycle or toggle rate of each subsystem is less than 100% because not all circuits are in use at all times. Depending on the fabrication technology, a circuit will age and degrade at different rates depending on the duty cycle or toggle rate at which it is operated. In many very large scale integration technologies, a transistor switch will age more quickly at a lower toggle rate. Accordingly, a sensor that is operated at a 100% toggle rate will not age at the same rate as a logic path of a monitored path in the normal operation of the system. Accordingly, reducing the toggle rate of the sensors allows the sensors to more accurately track the ageing of the monitored circuits.

In addition, the second sensor array 608 may be switched off or operated at a low duty cycle to reduce power consumption while still providing monitoring coverage during voltage droops. A margin status 644 from the first sensor array 606 is applied to a conditional enabling controller 642 which may be implemented as a part of a monitor controller 610 or as a separate component. The conditional enabling controller 642 generates an enable signal 646 to enable the second sensor array 608 when the margin status indicates that more accurate margin tracking is appropriate, e.g., upon a voltage droop event. The sensors are configured near logic paths 604 of processors and memories and are operated to replicate worst-case operation of the respective logic paths.

In this example, the first sensor array 606 is formed in the integrated circuit of the SoC 602. The sensors of the first sensor array 606 have paths through the integrated circuit and are configured to generate first level indications of a condition of the integrated circuit. Similarly, the second sensor array 608 is formed in the integrated circuit. The sensors of the second sensor array 608 have paths through the integrated circuit and are configured to generate second level indications of the condition of the integrated circuit. In the present description a path through the integrated circuit is a path that has been fabricated as a part of the integrated circuit using the same or a similar technology as the monitored circuits. The multiple sensors are able to provide distributed coverage through the IC to observe the effects of local variations and to deploy different kinds of replicas which reflect a greater variety of paths through the IC. The first level indications and second level indications may be multiple bit diagnostic codes or have some other format. In some aspects, the second level indications may offer full reporting precision or full reporting depth with respect to the first level indications. In some aspects, the sensors of the first sensor array and the sensors of the second sensor array have the same accuracy, resolution, reporting depth and operating range. The sensors may be similar or identical between the first sensor array and the second sensor array. The accuracy, in terms of resolution and measurement error, may also be the same. In some aspects, the sensors of the first sensor array have lower accuracy, lower resolution, or a lesser operating range and, as described below, are used to enable the second sensor array. The first sensor array in such an aspect determines some degradation of the timing margin and then the second sensor array is enabled to report timing margin with full reporting precision or full reporting depth of the timing margin.

The monitor controller 610 is coupled to the first sensor array 606 and to the second sensor array 608 and is config- ured to receive the first and second level margin indications. The monitor controller 610 or Conditional Enabling Controller 642 may actuate the second sensor array 608 in response to a depth-of-margin of the first level indications falling below a threshold. A control channel 611 is coupled to the monitor controller 610, to the first sensor array 606 and to the second sensor array 608. The second sensor array may be actuated by an enable signal from the monitor controller 610 on the control channel 611 and disabled by a disable signal from the monitor controller 610 on the control channel 611. In another implementation, the 2nd sensor array may be actuated by an enable signal 646 from the Conditional Enabling Controller 642.

The monitor controller 610 includes a toggle rate controller 612 coupled to the first sensor array 606, the L1 array, and to the second sensor array 608, the L2 array, to control a toggle rate of the second sensor array 608. In some examples, the toggle rate of the first sensor array 606 is tied to the clock rate of the system. In some examples, the toggle rate controller 612 controls the toggle rate of the first sensor array 606 and the second sensor array 608. In some examples, the toggle rate controller 612 is configured to observe an enable signal 646 to the second sensor array 608 and infer the toggling rate of the second sensor array 608, to compare the toggle rate of the second sensor array 608 to a worst-case toggle rate of the system and to adjust the toggle rate of the second sensor array 608 in response to the comparison by adjusting a margin threshold of the first sensor array 606 upon which second sensor array 608 is actuated. The toggle rate controller may adjust the second sensor array 608 toggle rate to increase or decrease degradation of the second sensor array 608 as compared to the logic paths 604. The toggle rate controller may observe the second sensor array 608 toggle rate by counting a number of enabling events of the second sensor array 608 within a pre-configured time window. In some examples, the number of enabling events of the second sensor array 608 is counted by observing the enable signal 646. The second sensor array 608 is activated by the enable signal 646. The enable signal 646, when enabled, may enable a clock, or allow a start point to toggle internally within the second sensor array 608. The toggle rate controller 612 operates such that the enable signal 646 follows the target toggle rate.

The first sensor array 606 includes a first aggregator 632 to aggregate the first level indications of the sensors of the first sensor array 606, e.g., aggregate the first diagnostic codes, and to generate a margin code from the first sensor array 606. Similarly, the second sensor array 608 includes a second aggregator 634 to aggregate the second level indications of the sensors of the second sensor array, e.g., aggregate the second diagnostic codes, and to generate a margin code for the second sensor array 608. The monitor controller 610 receives the margin codes from both the first aggregator 632 and the second aggregator 634 though the control channel 611. When the first or second level indications suggest a warning or error, interrupt logic 636 of the SoC 602 may be activated to inform the system or an event may be logged in sticky flags of the log 614 to be read later by the monitor controller 610 or the external SMCU 630. The system may take an appropriate remedial action according to safety policy or provide a trigger or a maintenance condition. The interrupt logic may be configured to initiate a shutdown process for at least a portion of the integrated circuit in response to the margin code. The interrupt logic 636 may be integrated with the monitor controller 610 or with other components of the SoC 602.

The monitor controller 610 is also coupled to or includes a log 614 to store the diagnostic codes from the first sensor array 606 and the second sensor array 608. The monitor controller 610 receives margin codes over time as a sequence of diagnostic codes. The monitor controller may form a diagnostic code sequence that the monitor controller 610 stores in the log or informs a processor to store in a log with corresponding time stamps and other coincidental information like temperature, frequency, or an indication of the current use case. The monitor controller 610 may be configured to store a diagnostic code sequence in the log 614 when a code of the diagnostic code sequence exceeds a pre-configured marginality threshold. The monitor controller 610 is able to use the diagnostic code sequence to determine a condition of the integrated circuit. The monitor controller may then generate a health signal and send the health signal to a higher layer, e.g., an external safety MCU 630. In some examples, the monitor controller 610 compares the health signal to a threshold and sends the health signal to the higher layer in response to the health signal exceeding the threshold.

The log 614 may also be used to store ageing markers. An ageing marker may be an analysis that has been applied to the sequences of diagnostic codes, e.g., using a marginality threshold. As an example, an ageing marker may be used to mark an ageing event such as a maintenance event, e.g., a degradation of the speed of the logic paths 604 of processors and memories. An ageing marker may include an indication that the maintenance event occurred and indicate additional diagnostic information such as the voltage setpoint applied, the clock frequency that was applied, the temperature, a timestamp, and other information, e.g., a use case, system lifetime, etc. The ageing markers may be used at system boot to indicate that the voltage should be increased upon the next boot. The number of ageing markers and the last voltage setpoint may be used to predict when the voltage may not be increased any further and therefore the end of life of the system.

The external SMCU 630 may take different remedial actions upon receiving the health signal. In some examples, the external SMCU accesses the log 614 through an external data port of the monitor controller 610 or of the SoC 602 to interpret the diagnostic code sequence. In some examples, the external SMCU 630 sends a shutdown command to the SoC 602. In some cases, the SMCU sends a shutdown command to a safety island (not shown). In some cases, the SMCU sends a shutdown command to a central processing subsystem of the logic paths 604 of the SoC 602. The shutdown command can be received in the form of an interrupt, a software message or a hardware reset signal.

The external SMCU 630 may also be coupled to other external components, e.g., an external display 620 and a maintenance facility 622 to send e.g., a maintenance event, to the external display 620 and/or the maintenance facility 622. The monitor controller 610 or the external SMCU 630 may generate a user notification in response to analyzing the diagnostic code sequence. The user notification may be sent to the external display 620. The user notification may be sent through a radio interface or a wired interface to a maintenance facility 622. The radio interface may include a wireless Internet, Wi-Fi, cellular, unlicensed band or other wireless communication system and protocol. The monitor controller 610 or the external safety MCU may also determine an error condition of the integrated circuit and the user notification may indicate that a system associated with the IC is not operational. This notification may be sent to the external display 620, to the maintenance facility 622 or to another system.

In addition to the external notifications, the monitor controller 610 may also initiate a variety of remedial actions. The remedial actions are described as being initiated by the monitor controller 610 but any one or more of these remedial actions may instead be taken by the external SMCU 630, a different safety management subsystem of the SoC 602 (not shown), logic paths 604 of processors and memories of the SoC 602, another component, depending on the particular implementation. The monitor controller 610 receives the diagnostic codes and determines a condition of the integrated circuit as mentioned above. The remedial action may be to modify a power supply voltage to the logic paths 604, e.g., through a power management circuit 618 coupled to the monitor controller 610. The power management circuit 618 may be a PMIC as described above, or any other suitable power management circuit. The monitor controller 610 initiates a voltage remedial action to modify the power supply voltage by sending a command to the power management circuit 618. The monitor controller 610 may modify the power supply voltage by sending a command to a power management circuit 618 which in turn supplies voltage to the IC through a Power Delivery Network 616. In some aspects, a maintenance event is determined when there is no more room for additional remedial actions, i.e., the maximum number of ageing compensation steps have been taken so that the particular compensation is exhausted. As an example, the power supply voltage of the power management circuit cannot be increased more than a pre-defined value. Upon reaching that value, the next remedial action is not to raise the voltage again but to determine a maintenance event.

The monitor controller 610 may determine a timing margin of the integrated circuit and increase the power supply voltage to increase the timing margin. The monitor controller may set a flag in a configuration register 638 of the power management circuit 618 to trigger a speed test of the logic paths 604 upon a restart of the integrated circuit. Depending on the implementation, the test may be another type of test. In some aspects, if the margin is degraded then a built-in self-test (BIST) of the SoC or a component of the SoC may be performed to ensure that the SoC works correctly. In some aspects, a remedial action may be to reduce the functionality of the system, e.g., by disabling some parts or features of the system. In some aspects, the system may take a remedial measure on the next drive cycle or next system boot by using ageing markers in non-volatile memory.

The monitor controller 610 may be configured to store a flag in the log 614 of the monitor controller to modify the power supply voltage from after an integrated circuit restart. Results from the first aggregator 632 and the second aggregator 634 or only the second aggregator may be used to determine ageing markers for the logic paths 604 of processors and memories. The ageing markers may be stored in the log 614 as a sequence of diagnostic codes over time. The monitor controller may be configured to read the ageing markers upon any system start and apply a remedial action, e.g., ageing compensation, raising the voltage supply, limiting system functionality, and/or reporting a condition to the user, and/or preventing the system or a portion of the system from starting.

In some examples, the log 614 or another memory may be used as sticky registers to accumulate events regarding the margin indications. If, as an example, a reduced margin indication was detected by a sensor array for one cycle, then the sticky register will store this condition until the register is specifically cleared. A monitor controller 610, external SMCU 630, or other device or software can read the sticky register periodically, at the end of a drive cycle, or upon a restart and take a remedial action based on the margin indication events that are stored there. The remedial action may be the same as or similar to a remedial action that is taken in response to an interrupt from the interrupt logic 636.

In one example, interrupts are acted upon by storing an event log in a sticky register, which is a non-volatile register. A zero-margin indication may require immediate action but a reduced margin indication may be stored in the log or other non-volatile location. At the end of a drive cycle any margin indication events are stored for future use. On system startup, the event log in the sticky registers is read and any voltage adjustment to the IC is taken as indicated in the event log.

Figure 7:
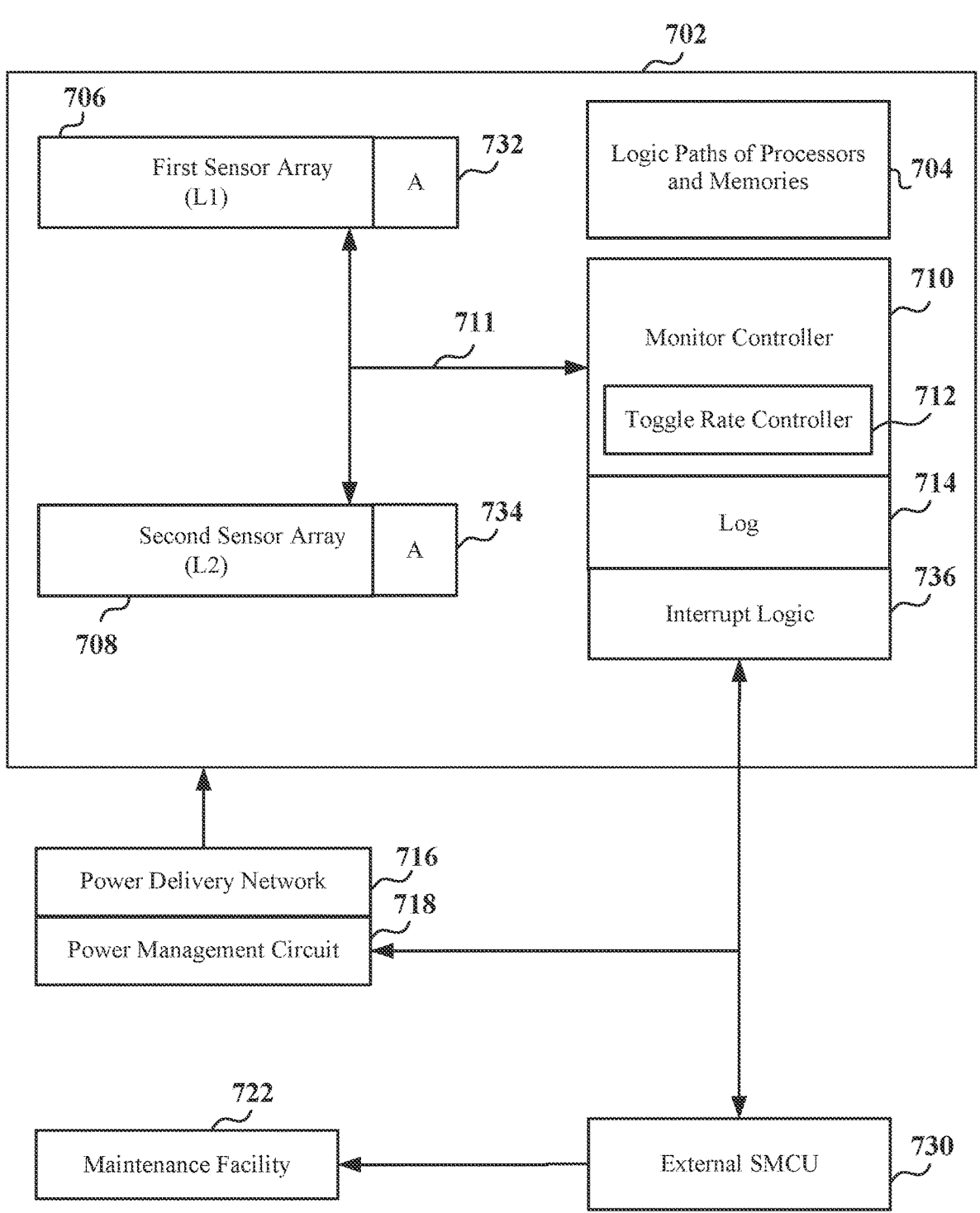
FIG. 7 is a functional block diagram of a second multiple tier sensor system according to aspects of the present disclosure.

FIG. 7 is a functional block diagram of a second multiple tier sensor system. An SoC 702 contains multiple logic paths 704 of the processors and memories of the SoC that are monitored by two levels, L1, and L2, of monitor circuits. The logic paths and the monitor circuits may be similar to those of FIG. 6. A first sensor array 706 represents the first level (L1) and a second sensor array 708 represents the second level (L2). Both the first sensor array 706 and the second sensor array 708 are coupled to a monitor controller 710 through a control channel 711. The second sensor array 708 may be actuated by an enable signal from the monitor controller 710 on the control channel.

The monitor controller 710 is coupled to the first sensor array 706 and to the second sensor array 708 and is configured to receive respective first and second level margin indications. The margin indications may be indications of setup timing margin conditions. The monitor controller 710 may actuate the second sensor array 708 in response to the one or more first level indications, e.g., the one or more first level indications falling below a threshold. The second sensor array may be configured to replicate a worst-case operation instance of the respective logic path. The second sensor array may also have many more sensors than the first sensor array.

The monitor controller 710 includes a toggle rate controller 712 coupled to the first sensor array 706, the L1 array, and to the second sensor array 708, the L2 array, to control a toggle rate of the second sensor array 708 through the control channel 711. The first sensor array 706 includes a first aggregator 732 coupled to the control channel 711 to aggregate the first level indications of the sensors of the first sensor array 706 and to generate a margin code from the first sensor array 706. Similarly, the second sensor array 708 includes a second aggregator 734 coupled to the control channel 711 to aggregate the second level indications of the sensors of the second sensor array and to generate a margin code for the second sensor array 708. The monitor controller 710 receives the margin codes from both the first aggregator 732 and the second aggregator 734 though the control channel 711. The monitor controller may combine the margin codes from the first aggregator 732 with the margin codes from the second aggregator 734 to generate a final margin code. When the margin code from the second aggregator or both the first and the second aggregator suggest a warning or error, interrupt logic 736 of the SoC 702 may be activated to inform the system.

The monitor controller 710 is also coupled to or includes a log 714 to store the diagnostic codes from the first sensor array 706 and the second sensor array 708. The log may store a sequence of diagnostic codes, ageing markers, and other events. The log may also store additional diagnostic information such as the voltage setpoint applied, the clock frequency that was applied, the temperature, a timestamp, and other information, e.g., a use case, system lifetime, etc. The monitor controller may generate a health signal and send the health signal to a higher layer, e.g., an external SMCU 730.

The external SMCU 730 may act in response to the health signal from the monitor controller or in some examples, the external SMCU accesses the log 714 through an external data port of the monitor controller 710 or of the SoC 702. The external SMCU 730 may also be coupled to other external components, e.g., a maintenance facility 722. In addition to the external notifications, the monitor controller 710 may also initiate a variety of remedial actions such as increasing the power supply voltage to increase the timing margin. In some aspects, the remedial measure is taken on the next drive cycle or next system boot by using ageing markers in non-volatile memory.

Figure 8:
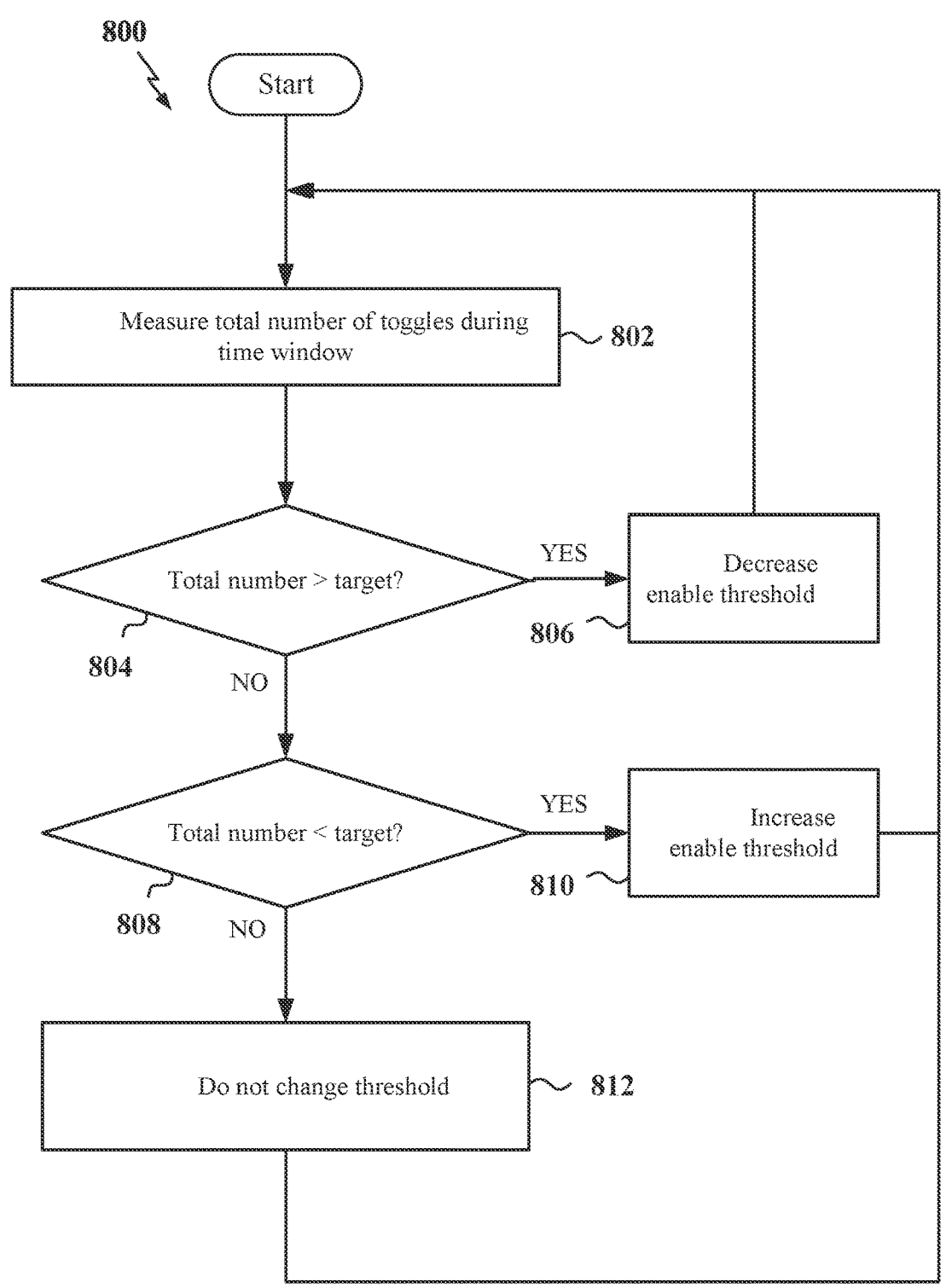
FIG. 8 is a flow diagram of setting a toggle rate for a second sensor array to obtain a target toggle rate according to aspects of the present disclosure.

FIG. 8 describes the operation of the toggle rate controller 612 in more detail. A target toggle rate may be established based on a characterization of the circuits that are being monitored in a worst-case scenario or in any other way. In many IC's, a toggle rate that is less than repeated toggling at the system clock rate is common for many subsystems and reduces the lifetime, i.e., increases the wear on the circuit, compared to continuous operation at the clock rate, e.g., the system clock rate. A target rate may be selected that will age a monitor circuit more quickly than the expected normal operation of a circuit within the IC. The amount of increased ageing may be selected depending on the intended use for the IC and the monitor circuits of the second sensor array 608. The toggle rate controller 612 varies the activity level or duty cycle of the sensor array to meet that target rate. While the monitor circuit may be operated at the system clock rate when enabled, the same approach may be used when the clock rate of the sensor array is less than the system clock rate.

At 802, the total number of toggles for a sensor array is measured during a time window. The time window includes times when the sensor array is not enabled and times when the sensor array is enabled. The total number is then tested against the target rate. At 804, if the total number exceeds the target, then the threshold is decreased at 806. The threshold is the threshold for activating the second sensor array. In an example, a first sensor array 606 produces a margin status 644 that is analyzed in a conditional enabling controller 642, e.g., by threshold comparison to determine whether to activate the second sensor array. At 806, the threshold is decreased to move it closer to a zero-margin, which is a rarer condition. Accordingly, the second sensor array is activated less. If the total number of toggles does not exceed the target rate for the duration of the window, then at 808, if the total number is less than the threshold, then at 810 the threshold is increased toward a larger margin, which is a more common condition. Accordingly, the sensor array is activated for a longer duration of the time window. If the total number is neither greater than the target nor less than the target, then at 812 the threshold is not changed. The process returns to measure the total number of toggles during the next time window.

Figure 9:
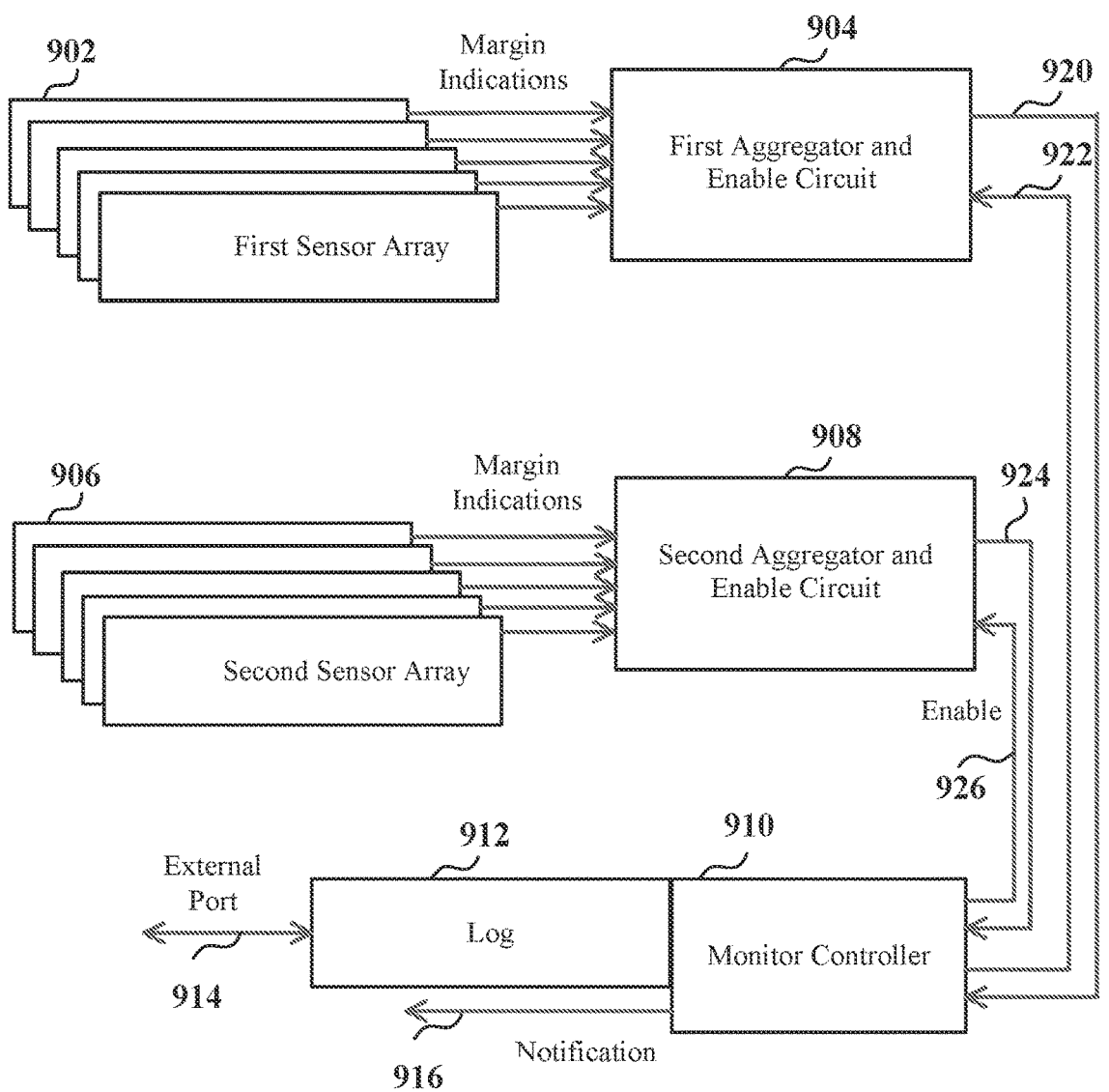
FIG. 9 is a diagram of a two-level sensor array according to aspects of the present disclosure.

FIG. 9 is a diagram of a two-level sensor array. A first sensor array 902 receives an enable signal 922 through a first aggregator and enable circuit 904 from a monitor controller 910. Upon being enabled, the first sensor array 902 generates margin indications to the first aggregator and enable circuit 904. The aggregated indications are sent to a monitor controller 910 and the monitor controller stores the aggregated indications in a log 912, e.g., when a code exceeds a marginality threshold. An external port 914 allows access to the log by external components (not shown). At the first aggregator and enable circuit 904, the aggregated margin indications of the first sensor array 902 are compared against a pre-set threshold. When the margin indications of the first sensor array 902 cross the thresholds, e.g., pre-configured activation thresholds, for the second sensor array 906, the second sensor array is actuated through the enable signal 926 from the monitor controller 910. When the margin indications of the first sensor array 902 cross back below the thresholds, e.g., pre-configured activation thresholds, for the second sensor array 906, the second sensor array is de-actuated through disabling the enable signal 926, negating the enable signal 926, or using a different disable signal. The first aggregator and enable circuit 904 sends the aggregated margin indications 920 to the monitor controller 910. These may be sent as a sequence of diagnostic codes. Additional status information of the first sensor array 902 may also be sent from the first aggregator and enable circuit 904 to the monitor controller 910. The second sensor array 906 may also be enabled through the logic of a Conditional Enabling Controller 642.

The monitor controller 910 sends an enable signal 926 that may also include a control rate signal to a second aggregator and enable circuit 908 of the second sensor array 906. The second sensor array 906 after being enabled sends margin indications to the second aggregator and enable circuit 908. The second aggregator and enable circuit 908 sends aggregated margin indications 924 to the monitor controller 910. Additional status information of the second sensor array 906 may also be sent to the monitor controller 910. The monitor controller analyzes the aggregated margin indications and sends notifications 916 or commands to external components, as discussed above. The second sensor array 906 may use the same monitor circuits as the first sensor array 902 or other monitor circuits that have more precision or that have more depth. The second sensor array 906 may also use many more monitor circuits than the first sensor array 902. The margin indications of the first sensor array 902 and of the second sensor array 906 may have one or more bits as described in the context of FIGS. 4 and 5.

FIG. 10 is a process flow diagram illustrating an example of a method for two-level monitoring as described herein. The method 1000 begins at block 1004 with generating one or more first level indications of a condition of an integrated circuit in a first sensor array formed in an integrated circuit. Sensors of the first sensor array may have paths through the integrated circuit.

The method also includes, at block 1006, actuating a second sensor array in response to the one or more first level indications falling below a threshold, sensors of the second sensor array having paths through the integrated circuit. In some aspects, the sensors of the second sensor array are more numerous than sensors of the first sensor array. In some aspects, the sensors of the second sensor array are same as those of the first sensor array. In some aspects, the sensors of the second sensor array are implemented with more precision or reporting depth. The second array may in this way offer full reporting precision or full reporting depth with respect to the first sensor array.

In block 1008, generating one or more second level indications of a condition of the integrated circuit in the second sensor array is performed upon actuation.

Figure 11:
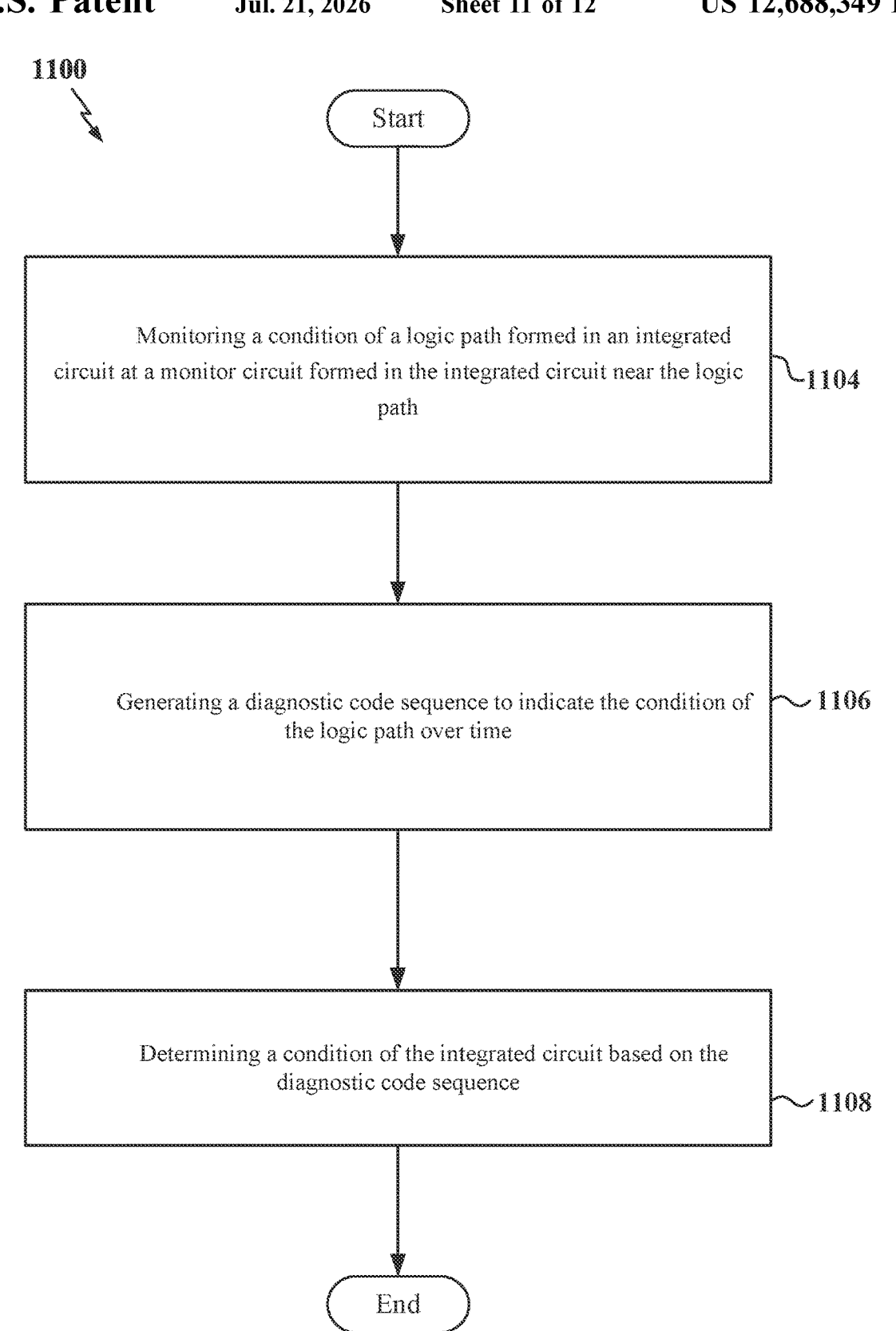
FIG. 11 is a flow diagram of aspects of predictive maintenance of an integrated circuit according to aspects of the present disclosure.

FIG. 11 is a process flow diagram illustrating and example of a method for predictive maintenance with a monitor circuit, as described herein. The method 1100 begins at block 1104 with monitoring a condition of a logic path formed in an integrated circuit at a monitor circuit formed in the integrated circuit near the logic path.

The method also includes, at block 1106, generating a diagnostic code sequence to indicate the condition of the logic path over time. In block 1108, determining a condition of the integrated circuit based on the diagnostic code sequence is performed.

FIG. 12 is a process flow diagram illustrating an example of a method for taking an internal remedial action using monitor circuits as described herein. The method 1200 begins at block 1202 with monitoring a condition of a logic path formed in an integrated circuit at a monitor circuit formed in the integrated circuit near the logic path. At block 1204 generating a diagnostic code sequence to indicate the condition of the logic path over time is performed.

The method also includes, at block 1206, storing the diagnostic code sequence in a log with a corresponding time stamp and at block 1208, determining a condition of the integrated circuit based on the diagnostic code sequence.

In block 1210 initiating a remedial action in response to the condition of the integrated circuit is performed.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In one or more exemplary aspects, the functions described may be implemented in hardware, software, firmware, or any combination thereof. If implemented in software, the functions may be stored on or transmitter over as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM, FLASH Memory or other optical disk storage or other magnetic storage devices, or any other medium that can be used to carry or store desired program code in the form of instructions or data structures and that can be accessed by a computer. Combinations of the above should also be included within the scope of computer-readable media.

The following provides an overview of examples of the present disclosure.

Example 1: An apparatus comprising an integrated circuit having a logic path formed in the integrated circuit; a monitor circuit formed in the integrated circuit, the monitor circuit being configured to monitor a condition of the logic path and to generate a diagnostic code sequence to indicate the condition of the logic path over time; and a monitor controller configured to receive diagnostic codes of the diagnostic code sequence, to store the diagnostic codes in a log with a corresponding time stamp and to determine a condition of the integrated circuit based on the diagnostic code sequence.

Example 2: The apparatus of example 1, wherein the monitor controller is configured to store the diagnostic codes in the log with one or more of timing margin code, time stamp, voltage, frequency, and a use case.

Example 3: The apparatus of example 1 or 2, comprising a second monitor circuit formed in the integrated circuit, the second monitor circuit being configured to generate a second diagnostic code to indicate the conditions of the logic path and wherein the monitor controller is configured to aggregate the first diagnostic code and the second diagnostic code.

Example 4: The apparatus of any one or more of the above examples, wherein the monitor controller is configured to receive the diagnostic code sequence and store the diagnostic code sequence in the log when a code of the diagnostic code sequence exceeds a marginality threshold.

Example 5: The apparatus of any one or more of the above examples, wherein the monitor controller is configured to generate a health signal in response to the diagnostic codes and to send the health signal to a higher layer.

Example 6: The apparatus of example 5, wherein the monitor controller is configured to compare the health signal to a health threshold and to send the health signal to the higher layer in response to the health signal crossing the health threshold.

Example 7: The apparatus of example 6, wherein the crossing the health threshold comprises detecting a lower timing margin.

Example 8: The apparatus of any one or more of the above examples, comprising: the log to store the diagnostic codes; and an external data port, wherein the log is accessible through the external data port.

Example 9: The apparatus of example 8, wherein the monitor controller is coupled to an external safety management control unit through the external data port and wherein the monitor controller is configured to send the condition of the integrated circuit to the external safety management control unit through the external data port.

Example 10: The apparatus of example 8, wherein the monitor controller is configured to receive a shutdown, or reduced functionality command from the external safety management control unit.

Example 11: The apparatus of example 8, wherein the external safety management control unit comprises a functional safety system controller coupled to the log through the external data port, wherein the external safety management control unit is configured to analyze the diagnostic code sequence and to predict maintenance.

Example 12: The apparatus of any one or more of the above examples, wherein the monitor controller is configured to generate a user notification in response to the diagnostic code sequence.

Example 13: The apparatus of example 12, wherein the user notification is an interrupt.

Example 14: The apparatus of example 12, wherein the user notification is sent to an external display.

Example 15: The apparatus of example 12, wherein the user notification is sent through a radio interface to a maintenance facility.

Example 16: The apparatus of any one or more of the above examples, wherein the monitor controller is configured to determine an error condition of the integrated circuit and wherein the user notification indicates that a system associated with the IC is not operational.

Example 17: A method comprising: monitoring a condition of a logic path formed in an integrated circuit at a monitor circuit formed in the integrated circuit near the logic path; generating a diagnostic code sequence to indicate the condition of the logic path over time; and determining a condition of the integrated circuit based on the diagnostic code sequence.

Example 18: The method of example 17, further comprising: generating a health signal in response to the diagnostic codes; comparing the health signal to a health threshold; and sending the health signal to a higher layer in response to the health signal crossing the health threshold.

Example 19: A computer-readable medium having instructions that when executed by the machine cause the machine to perform operations including: monitoring a condition of a logic path formed in an integrated circuit at a monitor circuit formed in the integrated circuit near the logic path; generating a diagnostic code sequence to indicate the condition of the logic path over time; and determining a condition of the integrated circuit based on the diagnostic code sequence.

Example 20: The medium of example 19, the operations further comprising: receiving a shutdown command in response to the condition of the logic path; and initiating a complete shutdown of one or all systems of the IC.

What is claimed is:

1. An apparatus comprising:
an integrated circuit having a logic path formed in the integrated circuit;
a monitor circuit formed in the integrated circuit, the monitor circuit being configured to monitor a condition of the logic path and to generate a diagnostic code sequence to indicate the condition of the logic path over time; and
a monitor controller configured to receive diagnostic codes of the diagnostic code sequence, to store the diagnostic codes in a log with a corresponding time stamp when a code of the diagnostic code sequence exceeds a marginality threshold and to determine a condition of the integrated circuit based on the diagnostic codes.

2. The apparatus of claim 1, wherein the monitor controller is configured to store the diagnostic codes in the log with one or more of timing margin code, time stamp, voltage, frequency, and a use case.

3. The apparatus of claim 1, comprising a second monitor circuit formed in the integrated circuit, the second monitor circuit being configured to generate a second diagnostic code to indicate the conditions of the logic path and wherein the monitor controller is configured to aggregate the first diagnostic code and the second diagnostic code.

4. The apparatus of claim 1, wherein the monitor controller is configured to generate a health signal in response to the diagnostic codes and to send the health signal to a higher layer.

5. The apparatus of claim 4, wherein the monitor controller is configured to compare the health signal to a health threshold and to send the health signal to the higher layer in response to the health signal crossing the health threshold.

6. The apparatus of claim 5, wherein the crossing the health threshold comprises detecting a lower timing margin.

7. The apparatus of claim 1, comprising:
the log to store the diagnostic codes; and
an external data port,
wherein the log is accessible through the external data port.

8. The apparatus of claim 7, wherein the monitor controller is coupled to an external safety management control unit through the external data port and wherein the monitor controller is configured to send the condition of the integrated circuit to the external safety management control unit through the external data port.

9. The apparatus of claim 7, wherein the monitor controller is configured to receive a shutdown, or reduced functionality command from the external safety management control unit.

10. The apparatus of claim 7, wherein the external safety management control unit comprises a functional safety system controller coupled to the log through the external data port, wherein the external safety management control unit is configured to analyze the diagnostic code sequence and to predict maintenance.

11. The apparatus of claim 1, wherein the monitor controller is configured to generate a user notification in response to the diagnostic code sequence.

12. The apparatus of claim 11, wherein the user notification is an interrupt.

13. The apparatus of claim 11, wherein the user notification is sent to an external display.

14. The apparatus of claim 11, wherein the user notification is sent through a radio interface to a maintenance facility.

15. The apparatus of claim 1, wherein the monitor controller is configured to determine an error condition of the integrated circuit and wherein the user notification indicates that a system associated with the IC is not operational.

16. A method comprising:
monitoring a condition of a logic path formed in an integrated circuit at a monitor circuit formed in the integrated circuit near the logic path;
generating a diagnostic code sequence to indicate the condition of the logic path over time;

storing diagnostic codes of the diagnostic code sequence in a log with a corresponding time stamp when a code of the diagnostic code sequence exceeds a marginality threshold; and determining a condition of the integrated circuit based on the diagnostic code sequence.

17. The method of claim 16, further comprising:

generating a health signal in response to the diagnostic codes;

comparing the health signal to a health threshold; and sending the health signal to a higher layer in response to the health signal crossing the health threshold.

18. A non-transitory computer-readable medium having instructions that when executed by the machine cause the machine to perform operations including:

monitoring a condition of a logic path formed in an integrated circuit at a monitor circuit formed in the integrated circuit near the logic path;

generating a diagnostic code sequence to indicate the condition of the logic path over time;

storing diagnostic codes of the diagnostic code sequence in a log with a corresponding time stamp when a code of the diagnostic code sequence exceeds a marginality threshold; and determining a condition of the integrated circuit based on the diagnostic code sequence.

19. The non-transitory computer-readable medium of claim 18, the operations further comprising:

receiving a shutdown command in response to the condition of the logic path; and initiating a complete shutdown of one or all systems of the IC.

* * * * *